(12) United States Patent
Meredith et al.

(10) Patent No.: US 10,470,024 B2
(45) Date of Patent: *Nov. 5, 2019

(54) MOBILE EMERGENCY RESPONSE NETWORK

(71) Applicants: AT&T Mobility II LLC, Atlanta, GA (US); AT&T Intellectual Property I, L.P., Atlanta, GA (US)

(72) Inventors: Sheldon Kent Meredith, Roswell, GA (US); William Cottrill, Canton, GA (US); Juliette Zerick, Bloomington, IN (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,207

(22) Filed: Feb. 26, 2018

(65) Prior Publication Data

US 2018/0192278 A1    Jul. 5, 2018

Related U.S. Application Data

(63) Continuation of application No. 15/180,602, filed on Jun. 13, 2016, now Pat. No. 9,918,211.

(51) Int. Cl.
| | |
|---|---|
| *H04W 4/90* | (2018.01) |
| *H04W 4/12* | (2009.01) |
| *H04M 3/51* | (2006.01) |
| *H04W 8/10* | (2009.01) |
| *H04M 15/00* | (2006.01) |
| *H04M 7/00* | (2006.01) |
| *H04W 4/029* | (2018.01) |

(Continued)

(52) U.S. Cl.
CPC .......... *H04W 4/90* (2018.02); *H04L 65/1016* (2013.01); *H04L 65/1053* (2013.01); *H04L 65/1063* (2013.01); *H04L 65/1069* (2013.01); *H04M 1/72536* (2013.01); *H04M 1/72547* (2013.01); *H04M 3/42059* (2013.01); *H04M 3/5116* (2013.01); *H04M 7/0051* (2013.01); *H04M 15/8033* (2013.01); *H04M 15/866* (2013.01); *H04W 4/029* (2018.02); *H04W 4/12* (2013.01); *H04W 4/24* (2013.01); *H04W 8/10* (2013.01); *H04M 2207/18* (2013.01); *H04M 2242/04* (2013.01)

(58) Field of Classification Search
CPC ........... H04W 4/22; H04W 4/02; H04W 8/10; H04M 15/866
USPC .... 455/404.2, 433, 445, 456.1, 456.5, 404.1
See application file for complete search history.

(56) References Cited

U.S. PATENT DOCUMENTS

| | | |
|---|---|---|
| 7,035,381 B2 | 4/2006 | D'Ascenzo et al. |
| 7,103,153 B2 | 9/2006 | Stumer et al. |

(Continued)

*Primary Examiner* — Congvan Tran
(74) *Attorney, Agent, or Firm* — BakerHostetler

(57) ABSTRACT

A mobile emergency response network may be utilized to respond to emergencies. Emergency response resources may be selected and deployed through the use of network communications between user equipment and network elements. In an example configuration, a mobile emergency response network may receive emergency data, determine an emergency is occurring, determine a resource requirement for the emergency, identify a mobile device associated with a user who meets the resource requirement, and send a request to the mobile device.

20 Claims, 14 Drawing Sheets

(51) Int. Cl.
　　　*H04L 29/06*　　　(2006.01)
　　　*H04M 3/42*　　　(2006.01)
　　　*H04W 4/24*　　　(2018.01)
　　　*H04M 1/725*　　　(2006.01)

(56) References Cited

U.S. PATENT DOCUMENTS

| | | |
|---|---|---|
| 8,363,102 B1 | 1/2013 | Kadoch et al. |
| 8,442,482 B2 | 5/2013 | Maier et al. |
| 8,489,066 B2 | 7/2013 | Imming et al. |
| 8,521,124 B2 | 8/2013 | Kamdar |
| 8,532,607 B2 | 9/2013 | Sennett et al. |
| 8,630,609 B2 | 1/2014 | Ray et al. |
| 8,755,767 B2 | 6/2014 | Maier et al. |
| 8,781,439 B2 | 7/2014 | Ray et al. |
| 8,817,952 B2 | 8/2014 | Bentley et al. |
| 8,897,826 B2 | 11/2014 | Singhal |
| 8,942,667 B2 | 1/2015 | Edge et al. |
| 8,982,871 B2 | 3/2015 | Ray et al. |
| 9,148,770 B2 | 9/2015 | Mohler et al. |
| 9,179,280 B2 | 11/2015 | Ray et al. |
| 2008/0045232 A1* | 2/2008 | Cone ............... H04W 4/02 455/456.1 |
| 2013/0332026 A1 | 12/2013 | McKown et al. |
| 2014/0086108 A1 | 3/2014 | Dunn et al. |
| 2015/0312741 A1 | 10/2015 | Terpstra |
| 2015/0373091 A1 | 12/2015 | Sanghavi et al. |
| 2017/0019777 A1* | 1/2017 | Cole, Jr. ............ H04W 4/22 |

\* cited by examiner

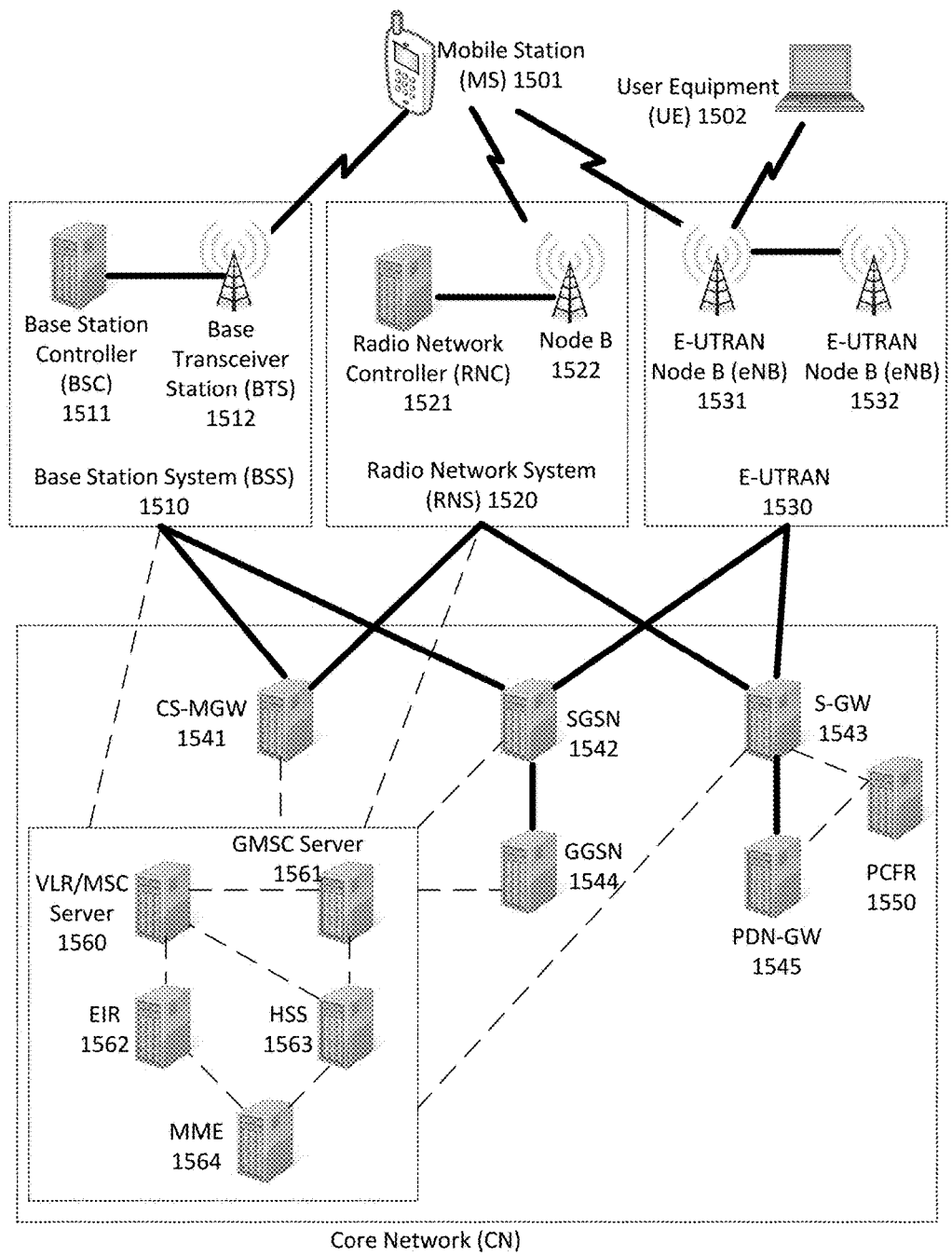

MOBILE EMERGENCY RESPONSE NETWORK

CROSS REFERENCE TO RELATED APPLICATIONS

This application is a continuation of U.S. patent application Ser. No. 15/180,602, filed on Jun. 13, 2016, which is incorporated herein by reference in its entirety.

BACKGROUND

Emergency response services are coordinated by a series of isolated, discrete systems typically organized at a tier of local government, such as at the county level in the United States. These systems, referred to generally in the United States as public safety answering points (PSAP), are unable to coordinate targeting of emergency responders and emergencies due to the technological limitations of existing systems. Furthermore, while certain fire, police, or ambulatory services may be available to assist with an emergency, those resources may be leveraged inefficiently or not at all due to the network limitations of PSAPs.

SUMMARY

As disclosed herein, a mobile emergency response network may provide a control framework for detecting emergencies and managing and directing emergency response resources. Interactive controls may be generated for communications between multiple devices across heterogeneous communication networks within the emergency response network.

In an aspect, an emergency services server for a mobile emergency response network may include a processor and memory coupled to the processor. The memory may include executable instructions that when executed by the processor cause the processor to effectuate operations. The operations may include receiving, from a first remote mobile device over a first wireless communication channel, a first emergency message including a first multimedia data file. The first multimedia data file may include first metadata. The operations may also include receiving, from a second remote mobile device over a second wireless communication channel, a second emergency message including a second multimedia data file. The second multimedia data file may include second metadata. The operations may also include separating the first multimedia data file from the first emergency message, extracting a first location value from the first metadata, separating the second multimedia data file from the second emergency message, and extracting a second location value from the second metadata. The operations may also include aggregating the first multimedia data file and the second multimedia data file, generating an emergency responder request including the aggregated first and second multimedia data files, and defining, based on the first location value and the second location value, a candidate region. The operations may also include identifying a candidate mobile device within the candidate region, wherein the candidate mobile device is not the first remote mobile device or the second remote mobile device, and transmitting the emergency responder request over a third wireless communication channel to the candidate mobile device.

In an aspect, a method for implementing a mobile emergency response network may include an emergency services server receiving from a first remote mobile device a first emergency message including a first multimedia data over a first wireless communication channel. The first multimedia data may include first metadata. The method may also include the emergency services server receiving from a second remote mobile device over a second wireless communication channel a second emergency message including a second multimedia data file. The second multimedia data file may include second metadata. The method may also include the emergency services server separating the first multimedia data file from the first emergency message. The method may also include the emergency services server extracting a first location value from the first metadata. The method may also include the emergency services server separating the second multimedia data file from the second emergency message. The method may also include the emergency services server extracting a second location value from the second metadata. The method may also include the emergency services server aggregating the first multimedia data file and the second multimedia data file. The method may also include the emergency services server generating an emergency responder request including the aggregated first and second multimedia data files. The method may also include the emergency services server defining, based on the first location value and the second location value, a candidate region. The method may also include the emergency services server identifying a candidate mobile device within the candidate region, wherein the candidate mobile device is not the first remote mobile device or the second remote mobile device. The method may also include the emergency services server transmitting the emergency responder request over a third wireless communication channel to the candidate mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Aspects of the herein described mobile emergency response network are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

FIG. 14 illustrates a Public Land Mobile Network (PLMN) block diagram view of an exemplary architecture in which one or more disclosed examples may be implemented for a mobile emergency response network.

DETAILED DESCRIPTION OF ILLUSTRATIVE EMBODIMENTS

Figure 1:
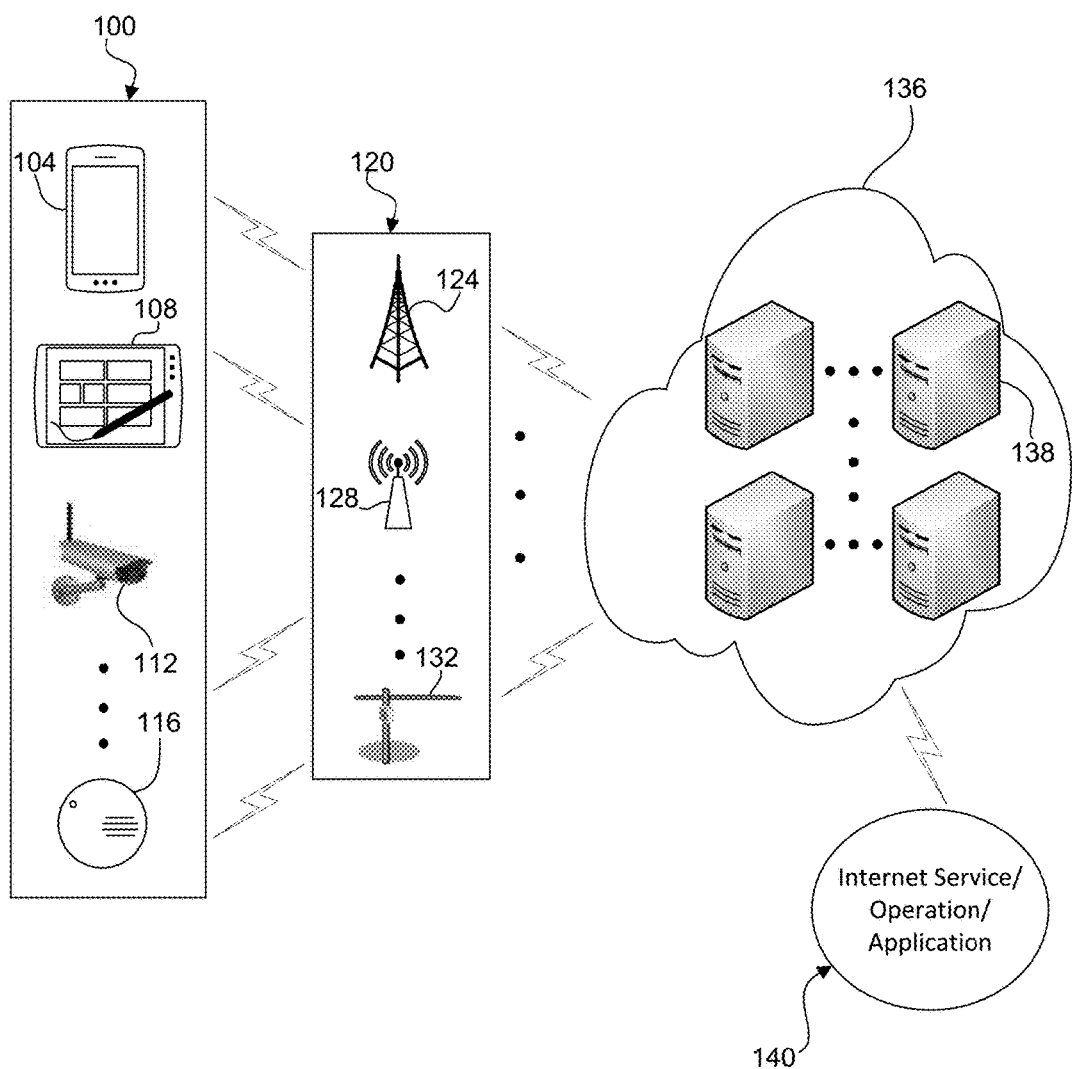
FIG. 1 is a depiction of an exemplary network environment in which one or more disclosed examples may be implemented for a mobile emergency response network.

FIG. 1 illustrates an example telecommunication system for a mobile emergency response network. As shown in FIG. 1, user equipment 100 may request a service, execute an application, perform an operation, or the like, from entity 140, via radio access technology 120 and a simplified telecommunications network 136. Telecommunications network 136 may include an emergency services server 138. As depicted in FIG. 1, user equipment 100 may comprise any appropriate type of user equipment, such as, for example, smartphone 104, tablet 108, camera 112, detector 116 (such as, for example, a smoke and/or carbon monoxide detector), a telematics unit (not shown), or the like, or any appropriate combination thereof. It is to be understood that user equipment 100 as depicted in FIG. 1 is exemplary and not intended to be limiting. User equipment may gain access to network via any appropriate mechanism. For example, as depicted in FIG. 1, access to network may be provided via cellular infrastructure, Wi-Fi™ infrastructure, hot spots, or the like, or any appropriate combination thereof. FIG. 1 depicts, as examples, macro cell 124 (e.g., LTE, 5G, etc.), Wi-Fi™ access point 128, and micro or metro cell 132. It is to be understood that radio access technology 120 as depicted in FIG. 1 is exemplary and not intended to be limiting.

Figure 2:
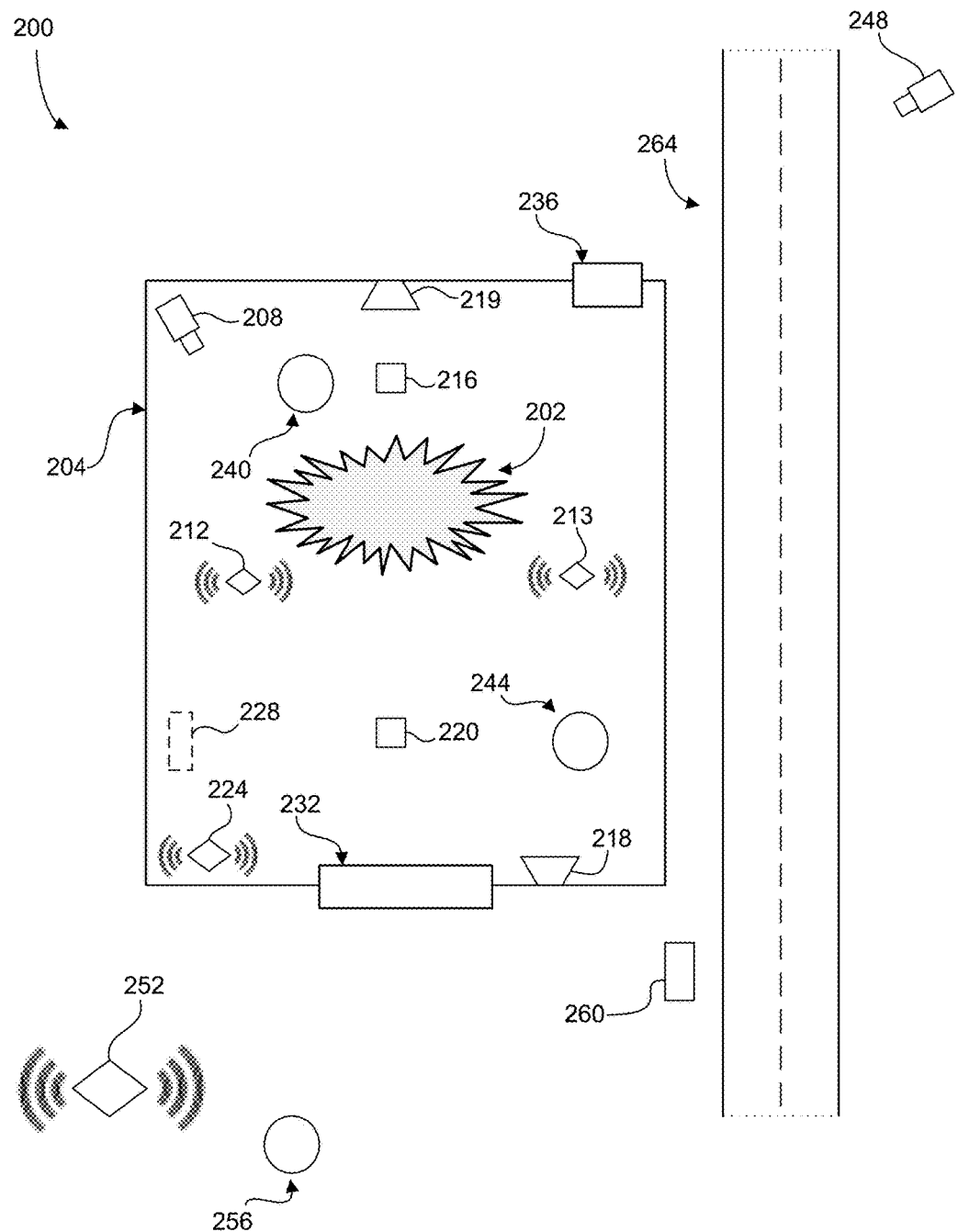
FIG. 2 is a depiction of an example emergency setting illustrating aspects of the present disclosure.

FIG. 2 is an overhead view of a depiction of emergency 200 illustrating aspects of the present disclosure. Scenario 200 may take place in structure 204 as a result of an emergency event 202. Event 202 may be an instant occurrence or multiple occurrences of the same type or different types. For example, event 202 may be a gas leak at time $t_0$, but at time $t_1$, may include one or more explosions, and at time $t_2$, may include one or more fires. As another example, event 202 may be a robbery at $t_0$, but may escalate to, for example, an assault at $t_1$, and there may be a medical emergency for victims following the shooting or assault. Event 202 is not limited to a static emergency and may include a dynamic scenario. Event 202 is shown as taking place within structure 204 for illustrative purposes only and is not limited to occurrences within buildings or enclosed environments—event 202 may be partially or totally within one or more structures, partially or totally outside of any structure, and may occur over time to encompass multiple environs. For example, at $t_0$, event 202 may be entirely within structure 204, but at $t_1$, event 202 may encompass areas outside of structure 204. As an example, event 202 may be a fire contained within structure 204 at $t_0$, but may spread beyond structure 204 at $t_1$. As another example, event 202 may begin at $t_0$, and a different, distinct event may occur at $t_1$ (or vice-versa, such that event 202 occurs after a preexisting event). Event 202 may initially overlap or not overlap with the other event, and may later overlap with the other event at, for example, $t_2$. For example, event 202 may comprise seismic activity, such as an earthquake, in a first area, such as structure 204, and the other event may comprise seismic activity in a second area. Event 202 may be a subset of a larger scale event and may arise from other events. For example, event 202 may be a person trapped beneath rubble after structure 204 has a structural failure. The failure may occur, for example, independently of events, but may also be precipitated or directly caused by another event, such as, for example, a vehicle collision (with structure 204), seismic activity, flooding, or ground movement, such as a landslide or sinkhole.

Structure 204 may have one or more detectors 116, such as detector 216 and detector 220. Detectors 216 and 220 may form or be part a network individually or together. For example, detectors 216 and 220 may individually or both be connected to a LAN (or different LANs) which may be shared with over devices such as camera 208. For example, detector 216 may connect to a LAN shared with camera 208 while detector 220 may connect to an LTE or 5G network through picocell 224. Detectors 216 and 220 may connect to the LAN via a wired or wireless connection, such as through wireless access point 212 or 213. Detectors 216 and 220 may also, independently or in response to a signal, connect with other devices, such as camera 208 or smartphones 104 associated with, for example, user 240 or 244. Detectors 216 and 220 may connect directly with other devices, such as camera 208 or smartphones 104 through, for example, wired connections or wireless connections such as Bluetooth™ or infrared (IrDA). Detectors 216 and 220 may be mounted on walls, including ceilings, or within systems such as, for example, heating, ventilating, and air conditioning (HVAC) systems. For example, detectors 216 and 220 may be within ducts or connected with ducts, such as a duct connected with vent 228, fluidly or communicatively (e.g., connection to duct control system or sensors). Detectors 216 and 220 may be part of or connected with a fire protection system, such as, for example, a water or foam water sprinkler system. For example, detectors 216 and 220 may include a temperature sensor and may indicate for or cause water to be released through sprinkler heads when the ambient temperature exceeds a threshold. As another example, detectors 216 and 220 may include a humidity sensor, which may, for example, determine air moisture levels to indicate for or cause water flow through sprinkler heads to start, increase, decrease, or stop. As yet another example, detectors 216 and 220 may include a vibration sensor or seismometer and may indicate, for example, motions of structure 204 or ground motion. For example, detectors 216 and 220 may indicate stresses on a structural component of structure 204. Detectors 216 and 220 may indicate when, for example, stress exceeds a threshold. This may be, for example, vibration in a load-bearing column of structure 204. As another example, detectors 216 and 220 may include or be included in, for example, a seismic damper. As yet another example, detectors 216 and 220 may include an audio sensor or audio capture device, such as a microphone. Detectors 216 and 220 may generate an acoustic profile of audio captured or otherwise received by detectors 216 and 220. The acoustic profile may be used, for example, by detector 216 and 220 to determine a gunshot has been fired and the location of the gunshot.

Structure 204 may have one or more cameras, such as cameras 208 and 248. Camera 248 may, for example, be configured to overlook exterior features of structure 204 and environmental assets or features and transportation or navigational asserts or features of the area around structure 204. For example, camera 248 may encompass in its field of vision thoroughfare 264. Thoroughfare 264 may include, for example, one or more of a road, sidewalk, trail, or a parking lot. Structure 204 and the area surrounding structure 204 may have specialized resources for emergency situations. For example, emergency resource 260 may be a hydrant, such as, for example, a freestanding or non-freestanding hydrant, which may be pressurized or non-pressurized.

Structure 204 may have multiple ingress-egress points, such as ingress-egress points 232 and 236. Ingress-egress points 232 and 236 may include, for example, one or more doors or windows. Ingress-egress point 236 may be, for example, an emergency exit. Ingress-egress point 236 may include, for example, a sensor, such as a motion sensor, connected with one or more alarms, such as alarm 218 or 219. Ingress-egress points 232 and 236 may have electronic controls and electronic locks, which may be connected with one or more security systems of structure 204.

Cameras 208 and 248 may comprise user equipment 100, and may comprise camera 112. Cameras 208 and 248 may include one or more sensors, such as, for example, a motion detector. Cameras 208 and 248 may have audio capturing devices such as microphones. Cameras 208 and 248 may be connected, wirelessly or wired, with one or more networks. For example, cameras 208 and 248 may be connected with a local area network (LAN) via a wired connection or wirelessly through, for example, wireless access point 212 or 213. Alternatively or additionally, cameras 208 and 248 may be connected with another network, for example, an LTE or 5G network directly or through, for example, picocell 224. Cameras 208 and 248 may connect to one or more networks selectively. Using the instant example, camera 208 may have a constant, substantially constant, or intermittent connection to a LAN through, for example a wired or wireless connection. Cameras 208 and 248 may also be capable of making a connection to the LTE or 5G network, but only does so based on an event trigger or request. For example, camera 208 or 248 may operate to send images (such as streaming video or sending still images) over the LAN connection in response to a wake-up signal responsive to a sensor of camera 208 or 248, such as a motion detector, or a separate sensor or device, such as detector 216 or 220 or alarm 218 or 219. Cameras 208 and 248 may also control functions of alarm 218 or 219, such as alert functions. An alert may include one or more audible alerts (e.g., siren or warning broadcast) or visual alerts (e.g., strobe lights). Cameras 208 and 248 may connect to an LTE or 5G network through, for example, macro cell 252 or an intermediate device that can share such a connection, such as picocell 224 or a hotspot (using, for example, a Wi-Fi™ connection) in response to, for example, a signal from the LTE or 5G network, a signal from a LAN, or a signal from smartphone 104. Smartphone 104 may be associated with, for example, user 240 or 244, or a user not within structure 204, such as user 256, who may be an emergency responder. Smartphone 104 may also be associated with multiple users, such as, for example, an emergency responder group or unit). One or more users may be associated with one or more smartphones 104 (or other user equipment 100) by, for example, a Subscriber Identity Module (SIM) or a Universal Integrated Circuit Card (UICC) of the smartphone, which may include an International Mobile Subscriber Identity (IMSI). An IMSI may be used by, for example, a Home Location Register (HLR) or Visitor Location Register (VLR).

One or more of cameras 208 and 248, detectors 216 and 220, alarms 218 and 219, ingress/egress points 232 and 236, access points 212 and 213, and picocell 224 may be part of a security system network. Structure 204 may have a security system associated with it. This security system may include a controller in communication with other devices, such as cameras 208 and 248, detectors 216 and 220, alarms 218 and 219, ingress/egress points 232 and 236, access points 212 and 213, and picocell 224. The controller may be in communication with an external server, such as, for example, a monitoring center server. The controller may send "arm/disarm" commands to devices it is in communication with. An "arm" command may enable a device. Enablement may occur according to one or more of a schedule, on a trigger, or immediately. Similarly, a "disarm" command may disable a device. This may occur according to one or more of a schedule, on a trigger, or immediately.

Smartphone 104 may be in communication with one or more of cameras 208 and 248, detectors 216 and 220, alarms 218 and 219, and ingress/egress points 232 and 236. For example, smartphone 104 may connect with a LAN through a wireless connection using, for example, access point 212 or 213. Smartphone 104 may also be connected to a cellular network, such as an LTE or 5G network, through, for example, picocell 224 or macro cell 252. Smartphone 104 may poll devices. Polling may be done, for example, to determine if there is information available or if the device is available. Smartphone 104 may automatically poll devices or may, for example, poll in response to a request. User 240 may, for example, may generate a request to poll available devices using smartphone 104. Smartphone 104 may then poll for available devices and generate a report based on the responses or lack of responses to the polling. For example, smartphone 104 may generate a report including the available devices and information regarding the available devices, such as the type of device and its capabilities. Unavailable or unresponsive devices may also be included. For example, smartphone 104 may have polled at an earlier point in time when camera 208 indicated it was available. However, camera 208 may at the current time indicate it is unavailable. The report may indicate the unavailability of camera 208. Smartphone 104 may display the report. The report may be interactive. For example, user 240 may select an available device on smartphone 104 to generate a request to retrieve data from that available device.

Independent of or in conjunction with the use of polling or polling report generation, smartphone 104 may generate requests and send the requests to devices such as, for example, detectors 216 and 220, alarms 218 and 219, and ingress/egress points 232 and 236. A request may be sent to a server in communication with the device. For example, camera 208 may be in communication with a media server. A request may be sent to the media server for information from camera 208 or another device.

Smartphone 104 may also receive information sent from devices. For example, detector 216 may broadcast an indication that carbon monoxide levels are high. Smartphone 104 may receive this indication and may, for example, render it on the display. The broadcast may be in the form of a push notification, for example. As another example, smartphone 104 may receive the broadcast from a server which is in communication with detector 216. Smartphone 104 may render this information and display it using display 304.

Figure 3:
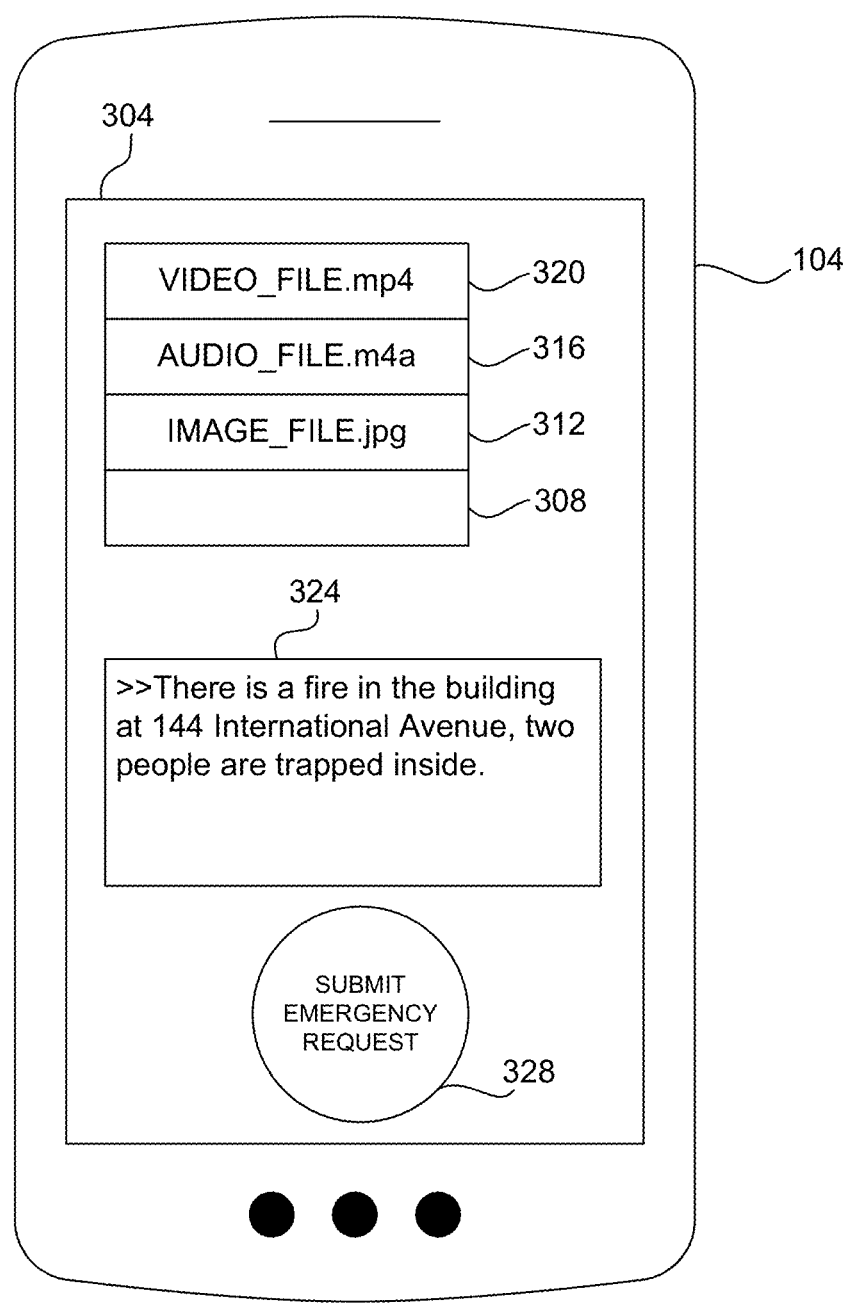
FIG. 3 is a depiction of a device illustrating aspects of the present disclosure.

FIG. 3 is a depiction of smartphone 104 illustrating aspects of the present disclosure. Smartphone 104, as depicted in FIG. 3, may include display 304. A user interface of an application is depicted as being displayed on display 304. The application may be client software. The user interface includes attachment fields 308, 312, 316, and 320, text input field 324, and command button 328. A user may generate, using the user interface of the application, an emergency request. The emergency request may include a description of the emergency entered in text input field 324. The emergency request may also include data, such as multimedia data. For example, a user may select a video file for inclusion, such as the video file listed in attachment field 320, an audio file, such as the audio file listed in attachment field 316, or an image file, such as the image file listed in attachment field 312. The user interface may continue to provide additional attachment fields, such as attachment field 308, as the user continues to attach additional files. One or more limits may be imposed, such as a request size limit. The limits may be imposed by the application as either set directly by the application on smartphone 104, such as through a user preference. The limits may also be set by a third party, such as emergency services server 138, and then enforced by the application on smartphone 104. For example, a 1 megabyte size limit may be set. Smartphone 104 may transmit an emergency request to emergency services server 138. Command button 328 may be used to execute send/transmit commands or other commands. Additional information may be appended to files. For example, a user may add geographic location data to a file. For example, when a user selects a file to be included with the request, the user may, with or without prompting, select geographic coordinates to append to the file. For example, a user may not be in the same geographic location as the emergency. The user may receive an image file taken of the emergency. The image may originate from the location of emergency 200. For example, it may have been generated using a camera (or device equipped with a camera) and transmitted to smartphone 104. The user may tag the file with location data. The location data may then be used by emergency services server 138 as at least part of a determination of the location of the emergency.

Smartphone 104 may receive a communication from emergency server 138. For example, emergency services server 138 may have received an emergency request originating from either smartphone 104 or another device. In response, emergency server 138 may send a message to smartphone 104. Text included in the message may be rendered in text input field 324. This may be displayed as, for example, a dialog. Communication between smartphone 104 and emergency server 138 may be according to, for example, the Extensible Messaging and Presence Protocol (XMPP). Emergency services server 138 may, accordingly, support XMPP or be an XMPP server. Communications may also include additional parties, such as in the case of multi-user chat. For example, multiple users may connect to emergency services server 138 and be connected in a multi-user chat. Users may be connected in a multi-user (or one-on-one chat) based at least in part on, for example, emergency requests submitted by each of the respective users or a subset of the users. For example, a user may submit an emergency request to emergency services server 138 using smartphone 104. Emergency services server 138 may connect smartphone 104 into a chat with a device associated with an emergency responder.

Figure 4:
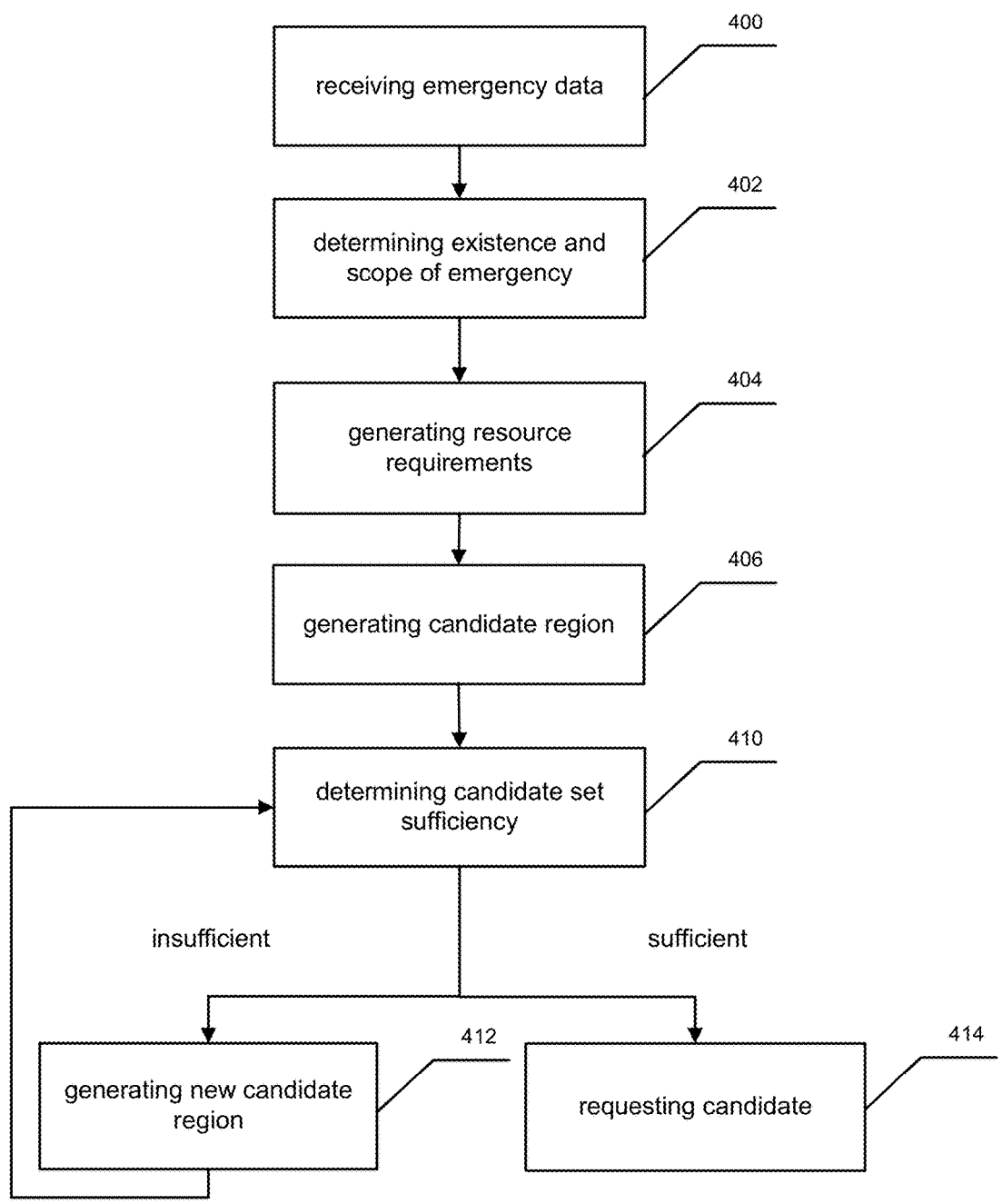
FIG. 4 is a depiction of an exemplary flow chart illustrating aspects of the present disclosure.

FIG. 4 is a depiction of an exemplary flow chart illustrating aspects of the present disclosure. At 400, emergency data is received by emergency service server 138. Emergency data may include, for example, one or more of an audio recording, an SMS or MMS message, an email, a video, an image, an alert. The emergency data may be transmitted from user equipment 100. For example, the emergency data may be an emergency request received from smartphone 104. For example, in reference to FIG. 2, user 244 may be associated with smartphone 104. Smartphone 104 may include an application which may package video, images, text, audio, and other data into an emergency request as depicted in FIG. 3. This data may be generated by smartphone 104 or other devices. For example, smartphone 104 may include a camera and it may be used to generate a video file. Smartphone 104 may also include data from other sources. For example, smartphone 104 may receive a video from tablet 108 associated with user 240. Smartphone 104 and tablet 108 may both be connected to a LAN using wireless access points 212 or 213. The emergency request may also include attributes based on analysis of the data included with the request.

Emergency data may also include an indication of an emergency from a PSAP. Emergency response server 138 may also be associated with one or more PSAPs and may receive the indication from another PSAP that emergency response server 138 is associated with or not. For example, a PSAP may receive a 911 call. On reception, the PSAP may transmit to the emergency service server 138 a message indicating the emergency. In another example, emergency response server 138 may be a PSAP server. As another example, emergency response server 138 may provide a dashboard or a website. As an example, emergency response server 138 may generate a dashboard on a PSAP client device. The client-side dashboard may be a user interface the PSAP (or other client-side entity or user) may use to send commands and information to emergency response server 138 and receive and render information from emergency response server 138. This may allow, for example, the customization of views or presented data according to use preference.

FIG. 4 is a depiction of an exemplary flow chart illustrating aspects of the present disclosure. At 400, emergency services server 138 receives emergency data. Emergency data may be, for example, one or more emergency requests or included in an emergency request. For example, an emergency request may be generated using smartphone 104 and received by emergency server 138. As another example, emergency data may include a 911 call. Information from the call may be received by emergency server 138 such as, for example, from a PSAP operator. As another example, emergency data may include alert data. For example, emergency services server 138 may receive alert data from detector 216. For example, detector 216 may include a motion sensor and may indicate that motion has been detected. As another example, detector 216 may include a carbon monoxide sensor and may indicate carbon monoxide levels, such as when levels have exceeded a threshold. Emergency services server 138 may separate certain elements of an emergency request from the emergency request, or may, for example, isolate certain elements entirely. For example, emergency services server 138 may separate, for example, multimedia files, header information, or other information that is, for example, not text content from an emergency request. Multimedia files, header information, or other information separated from an emergency request may be isolated from any other information separated from the emergency request. This may be done, for example, based on file type. For example, multimedia files may be separated from an emergency request but an image file (as opposed to, for example, an audio or video file) may be specifically isolated.

At 402, emergency services server 138 determines whether an emergency exists and, if so, the scope of the emergency. Emergency server 138 may determine whether an emergency exists based on, for example, the receipt of an emergency request. Emergency server 138 may determine whether an emergency exists using, for example, a flag or trigger. For example, emergency server 138 may receive an emergency request from smartphone 104 but may not determine if an emergency exists until receiving confirmation. Emergency server 138 may request confirmation or may have already received other information indicating an emergency. For example, a PSAP operator may receive a 911 call with details of an emergency. The PSAP operator may then indicate to emergency server 138 that an emergency exists. Emergency server 138 may then determine that an emergency exists. For example, a PSAP operator may indicate to emergency server 138 that an emergency exists. The PSAP operator may provide information to emergency server 138, such as, for example, a location, an emergency type, a phone number (such as a caller phone number), an identity (such as a caller's identity in the form of a name, Social Security number, driver's license number, date of birth, or other personally identifiable information), or other information. Emergency server 138 may also receive authorization to retrieve personal identification information and may retrieve that information from one or more databases, such as, for example, through a request to one or more servers. Emergency services server 138 may log emergency requests in a database including information about the request, including a timestamp and one or more attributes.

At 404, emergency services server 138 generates resource requirements for a response to the emergency. Resource requirements may include equipment requirements. For example, one or more firearms (or firearms of a certain class, such as a pistol or rifle, or model, such as an M4), munitions (such as breaching rounds or flashbangs), one or more vehicles (such as a fire engine or hazardous materials vehicle), one or more tools (such as a ram or a cutter), medical supplies (such as a defibrillator), or sets of equipment (such as a set of scuba gear). Resource requirements may include animal resources, such as one or more canines (or a subset of canines, such as detection canines). Resource requirements may be more detailed. For example, a requirement for a vehicle may include a requirement that the vehicle have certain resources, capabilities, or features. For example, a vehicle may be required to have a locker with certain weaponry, a ladder capable of extending a certain minimum length, a threshold amount of fuel available, or all-wheel drive. Resource requirements may include user equipment 100. For example, resource requirements may include smartphone 104, or that smartphone 104 have certain functions or capabilities. For example, resource requirements may include a requirement that smartphone 104 have specific software or hardware. For example, it may include a requirement that a smartphone have installed a specific application. It may further include a requirement that the specific application is in a certain mode or that smartphone 104 is in a specific mode. Resource requirements may also include personnel. For example, one or more police officers, one or more firefighters, one or more paramedics, or one or more animal control officers. Personnel resource requirements may include role, position, or rank. For example, non-volunteer, non-trainee, special weapons and tactics team member, aquatic rescue team member, or sniper. Personnel resource requirements may include specific skills, certifications, or experience. For example, helicopter piloting, diving, heavy equipment operation, or language fluency.

At 406, emergency services server 138 generates a candidate region. A candidate region may be defined by a series of coordinates, which may be determined or expressed as Global Positioning System (GPS) coordinates. The coordinates may follow a coordinate system, such as, for example, a geographic coordinate system such as longitude and latitude. A candidate region may be instructions for defining a candidate region, including an initial region and then additional regions to be set based on whether conditions are met. For example, if the resource requirements are not met using a first candidate region, a second candidate region may be defined. A candidate region may be, for example, an entire area within a straight-line geographical distance from the emergency. As another example, a candidate region may be based on estimated travel time, where travel time may be based on the vehicle or other transportation equipment available and traffic information.

At 410, emergency services server 138 determines the sufficiency of the candidate set. Sufficiency may be determined by a scoring. For example, personnel resource requirements may correspond to a numerical score based on one or more skill requirements, health requirements, or experience requirements. A candidate personnel resource may have an assigned score if the personnel resource is already within a database accessible to emergency services server 138. Emergency services server 138 may also retrieve from smartphone 104 associated with a candidate personnel resource information to determine a candidate personnel score. If a personnel resource score of a candidate is insufficient, then a request may not be sent to user equipment 100 associated with that candidate personnel resource, or the request may be, for example, given a lower priority.

At 410, it is determined if all the available resources could possibly meet the resource requirements of the emergency. For example, multiple types of resources may be required. For example, three police officers, a fire engine with five firefighters, and an ambulance with two paramedics may be needed. If, for example, only two police officers are within the candidate region, the candidate set is insufficient. If the candidate set is insufficient, at 412, emergency services server 138 generates a new candidate zone. The resources within the insufficient candidate region may not be requested or may be requested. This may be, for example, an expanded candidate zone corresponding to a greater geographical area. If the candidate set is sufficient, at 414, emergency services server 138 requests a candidate.

Figure 5:
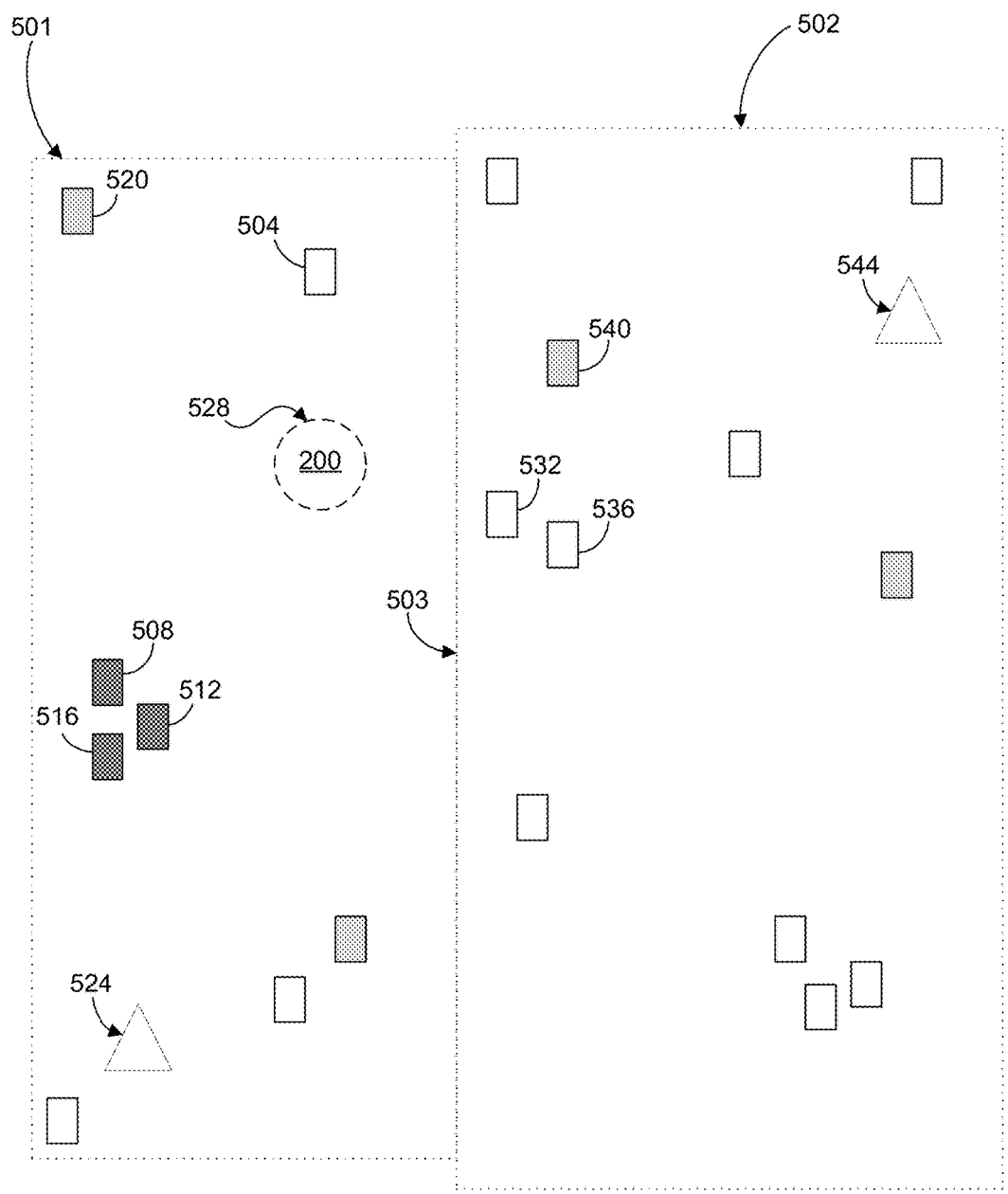
FIG. 5 is an exemplary diagram illustrating aspects of the present disclosure.

FIG. 5 is an overview of a depiction of an exemplary diagram illustrating aspects of the present disclosure. FIG. 5 depicts two regions: region 501 and region 502, defined by dotted lines. Regions 501 and 502 may be defined by a series of coordinates, which may be determined or expressed as Global Positioning System (GPS) coordinates. The coordinates may follow a coordinate system, such as, for example, a geographic coordinate system such as longitude and latitude. Region 501 and region 502 share border 503. Region 501 and region 502 may define boundaries of geographical regions based on, for example, administrative or governmental regions. Regions 501 and 502 may correspond with, for example, the borders of counties or municipalities. Region 501 and region 502 may also encompass several geographical regions and types of regions, such as multiple counties, multiple municipalities, school zones, transit systems, overlays, or jurisdictions. Regions 501 and 502 may also, for example, be defined in whole or in part by network infrastructure. For example, regions 501 and 502 may be defined by one or more macro cells 124. Regions 501 and 502 may also be defined by homogeneous or heterogeneous network elements, such as, for example, one or more macro cells 124, one or more micro cells 132, and one or more access points 128. Regions 501 and 502 may have a dynamic size and border. Regions 501 and 502 may change in size based on, for example, cellular network traffic, user equipment volume, or user preference. Regions 501 and 502 may be generated or modified by or through, for example, a dashboard or website, or may be used to generate or modify a dashboard or website. Regions 501 and 502 may also be subject to constraints. For example, an outer bound may be set based on one or more political, jurisdictional, or administrative boundaries. The outer bound may be a set of coordinates corresponding to one or more of such political, jurisdictional, or administrative boundaries. Other constraints may be to include only areas within the broadcast range of radio access technology 120. For example, one or more macro cells 124 or simply "all" macro cells 124, one or more micro cells 132 or simply "all" micro cells 124, one or more access points 128 or simply "all" access points 128, or a combination of one or more of these types of radio access technology 120. As another example, it may be constrained to those areas where the radio access technology 120 provides at least a threshold level of Quality of Service (QoS), available bandwidth, network technology (e.g., 3G; LTE, or 5G), or a combination of one or more of these constraints.

For example, the Federal Emergency Management Agency (FEMA) may declare an area a disaster area. Entity 140 may be or include a server or and may generate, for example, an Extensible Markup Language (XML) or Keyhole Markup Language (KML) file defining the declared area of the emergency. Alternatively or additionally, entity 140 may generate data which may be received from entity 140 or requested from entity 140 and may be used to, for example, generate or modify one or more XML or KML files. The file may be modified or a new file may be generated from the data in the file to be used to define regions 501 and 502. The declared area of the emergency data received from entity 140 may be used to generate, for example, an interactive view for a dashboard or website. Regions 501 and 502 may then be further defined by constraints. This may reduce regions 501 and 502 to those areas where, for example, a threshold level of network bandwidth is available. This may also reduce regions 501 and 502 to the area or areas indicated by a user such as, for example, through an interactive view. The interactive view may be presented in a user interface such as, for example, through a dashboard. While regions 501 and 502 are depicted, one region or more than two regions are within the scope of the present disclosure.

The location of emergency 200 is indicated on FIG. 5. As shown in FIG. 5, emergency 200 is located within region 501. Emergency 200 may have an emergency zone 528 created or associated with it. Emergency zone 528 is an area encompassing at least the known or estimated immediate geographic scope of emergency 200. Emergency zone 528 may include a wider area based on information received regarding the emergency. For example, if emergency 200 includes only a car accident, then emergency zone 528 may have a relatively small fixed size, such as a fixed radius or diameter, or a fixed distance along a roadway, from the car accident. If emergency 200 includes a shooting, then emergency zone 528 may have a greater size if, for example, the suspected shooter or shooters are unaccounted for or mobile. This may be determined based at least in part on, for example, an emergency request received from smartphone 104. For example, an emergency request may include an audio file. The audio file may be analyzed by emergency services server 138. Based on the analysis, emergency services server 138 may determine that the audio indicates an automobile wreck has occurred, or indicates a probability that an automobile wreck has occurred. Based on that indication, emergency zone 528 may be set or adjusted. For example, emergency zone 528 may be set as ten meters from the location of the emergency 200. The location of emergency may be, for example, assumed to be the location of a source of an emergency request. This assumption, however, may be adjusted, overridden, or replaced based on other information. The location of the source of the emergency request may be determined by, for example, a cell ID of a base station that received the emergency request, multilateration-based timing, or Wi-Fi localization. The location of emergency 200 (and emergency zone 528) may also be set or adjusted using data given in an emergency request. For example, processing of a video submitted with an emergency request may determine a landmark within the video and, based on that determination, set or adjust the location of emergency 200. As another example, a user may include a street address in the emergency request and the street address may be used to set or adjust the location of emergency 200. For example, the user may include the street address using text input field 324. Similarly, image files may be processed to determine landmarks. Metadata may also be analyzed to determine or adjust the location of emergency 200. A video file, audio file, or image file, for example, submitted with the emergency request may include metadata. For example, an image file may include metadata (such as Exchangeable image file format (Exif) structured data) specifying location (such as GPS data) and time information. Metadata may be extracted from the files and analyzed, transmitted, aggregated, or stored separately and independently from the files.

Emergency response resources 504, 508, 512, 516, 320, 528, 532, 536, and 540 are shown within regions 501 and 502. Emergency response resources 504, 508, 512, 516, 320, 528, 532, 536, and 540 may be, for example, military, police, fire, or ambulatory resources. For example, emergency response sources 504, 508, 512, 516, 320, 528, 532, 536, and 540 may be personnel or groups of personnel or assets. Personnel may be associated with user equipment 100. Assets or equipment may be or include user equipment 100. For example, a police asset may be a vehicle, such as a car, motorcycle, van, truck, riot control vehicle (e.g., armored personnel carrier), or all-terrain vehicle, or aircraft, such as, for example, a helicopter, blimp, or unmanned aerial vehicle. A police car, for example, may include user equipment 100 such as, for example, a telematics unit. Emergency response resources 504, 508, 512, 516, 320, 528, 532, 536, and 540 may include both an asset, such as a fire engine, and personnel, such as one or more firefighters.

Figure 6:
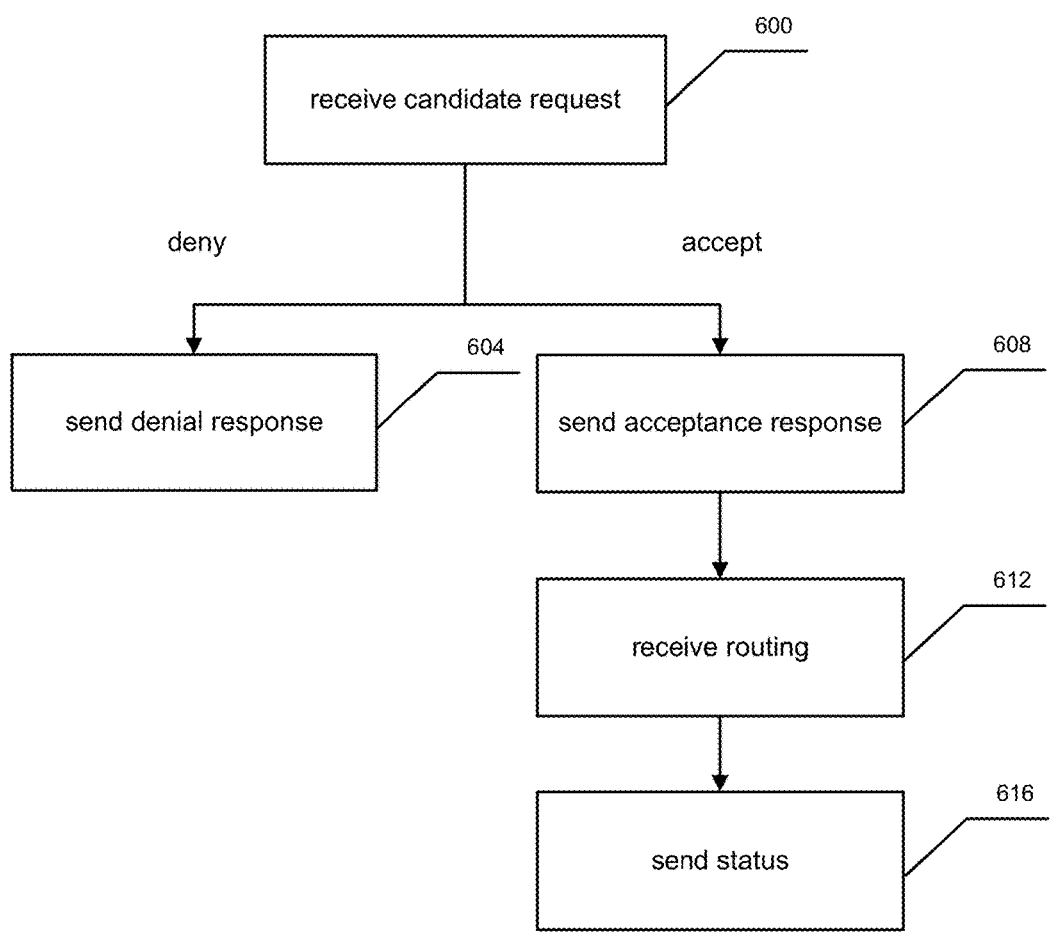
FIG. 6 is a depiction of an exemplary flow chart illustrating aspects of the present disclosure.

FIG. 6 is a depiction of an exemplary flow chart illustrating aspects of the present disclosure. At 600, user equipment 100 receives a candidate request. For example, smartphone 104 may receive a candidate request. The candidate request may be a push message. Smartphone 104 may be associated with a particular user, such as, for example, an emergency responder. Association may be determined, for example, by authentication through smartphone 104. For example, smartphone 104 may require one or more of a password, an answer to a challenge question, or a personal identification number. Emergency server 138 may receive the authentication. An authentication server may also receive the authentication and provide the authentication to emergency server 138. Authentication server may be a device management server. Device management server may provision user equipment 100. Device management server may provision user equipment 100 to particular user accounts. User accounts may be associated with particular individuals or groups. Device management server may provide this association to emergency server 138. For example, an emergency response organization, such as a municipal police department, may have a device management server. Device management server may provision user equipment 100 for specific police officer user accounts. For example, smartphone 104 may be provisioned to a police officer user account. The association of smartphone 104 with the police officer user account may be provided by the device management server to emergency server 104. For example, smartphone 104 may be associated with a police officer user account by, for example, International Mobile Equipment Identity (IMEI), SIM, or UICC. The entire user account may be provided by the device management server to the emergency services server 138. For example, emergency services server 138 may communicate using the Simple Object Access Protocol (SOAP). A device, such as a device management server, may connect to emergency services server 138. This connection may be, for example, a Hypertext Transfer Protocol (HTTP) or Hypertext Transfer Protocol Secure (HTTPS) connection. Emergency services server 138 may receive a SOAP message from a device management server. The message may include formatted data providing user account information, such as an identifier of smartphone 104 (such as an IMEI or IMSI), user account status (such as active, inactive, locked, or last login time), phone number, email address, username, password, permissions, or user identity. The message may also include formatted data providing skills information, such as number of years active duty, classification (such as police, ambulatory/paramedic, or firefighter), rank, pay grade, group membership (such as a unit or particular security detail), or equipment certified for or qualified on (such as certain firearms, vehicles, or tools). The message may also include certain individual attributes, such as gender or disability, and measurements of weight, height, and health or fitness (such as an ability to carry a certain load a certain distance within a certain amount of time or complete a one kilometer run within a certain amount of time), or indications of current or past injuries. The message may also include formatted data providing availability information, such as a shift schedule or indication of on duty or off duty (such as a flag). Emergency server 104 may use the identification of the police officer user account to identify skills, certifications, equipment, and other records. For example, emergency server 104 may include a database of this information, may receive it from the device management server (such as with the association information), or may request it from a third-party database. Emergency services server 138 may save these messages in a database, and may use the information contained in the messages to create or update entries in a database. Emergency services server 138 may be or act as an authentication server or device management server. Emergency services server 138 may be virtualized in whole or in part. For example, emergency services server 138 (or one or more of its functions) may be a virtualized application or virtual machine run on a computing device such as a server.

If there is a denial, at 604, a denial response may be sent using smartphone 104. The denial response may include, for example, a message explaining the denial. The denial response may be automatic. For example, it may be indicated on smartphone 104 that the user is engaged already. The engagement may be indicated to be a priority level, such as a low, medium, or high priority level. The engagement may be indicated using a classification code. Indication of the engagement may be used to disable prompts and automatically respond with a denial. This status indication may be provided to (or set by) emergency services server 138. If it is, it may be used to determine whether or not to send a request to smartphone 104. If there is an acceptance, at 608, an acceptance response may be sent using smartphone 104.

At 612, in response to the acceptance, smartphone 104 may receive directional routing to the emergency location. Emergency services server 138 may generate routing information and send it to smartphone 104. The routing may be, for example, in the form of a rendered roadmap indicating the emergency location and one or more routes. A route may be periodically updated and may include the determined fastest route to the emergency location. Smartphone 104 may also receive other data, such as multimedia files or text, from, for example, emergency services server 138. This data may include, for example, emergency request data submitted as depicted and described in relation to FIG. 3.

At 616, smartphone 104 may provide information to emergency services server 138. For example, a user may send files, messages, or other information to emergency services server 138. For example, a first responder may wish to provide additional information regarding the emergency. This may be submitted as depicted and described in relation to FIG. 3. Communications between emergency services server 138 and smartphone 104 may be logged by smartphone 104 or emergency services server 138, or both.

Figure 7:
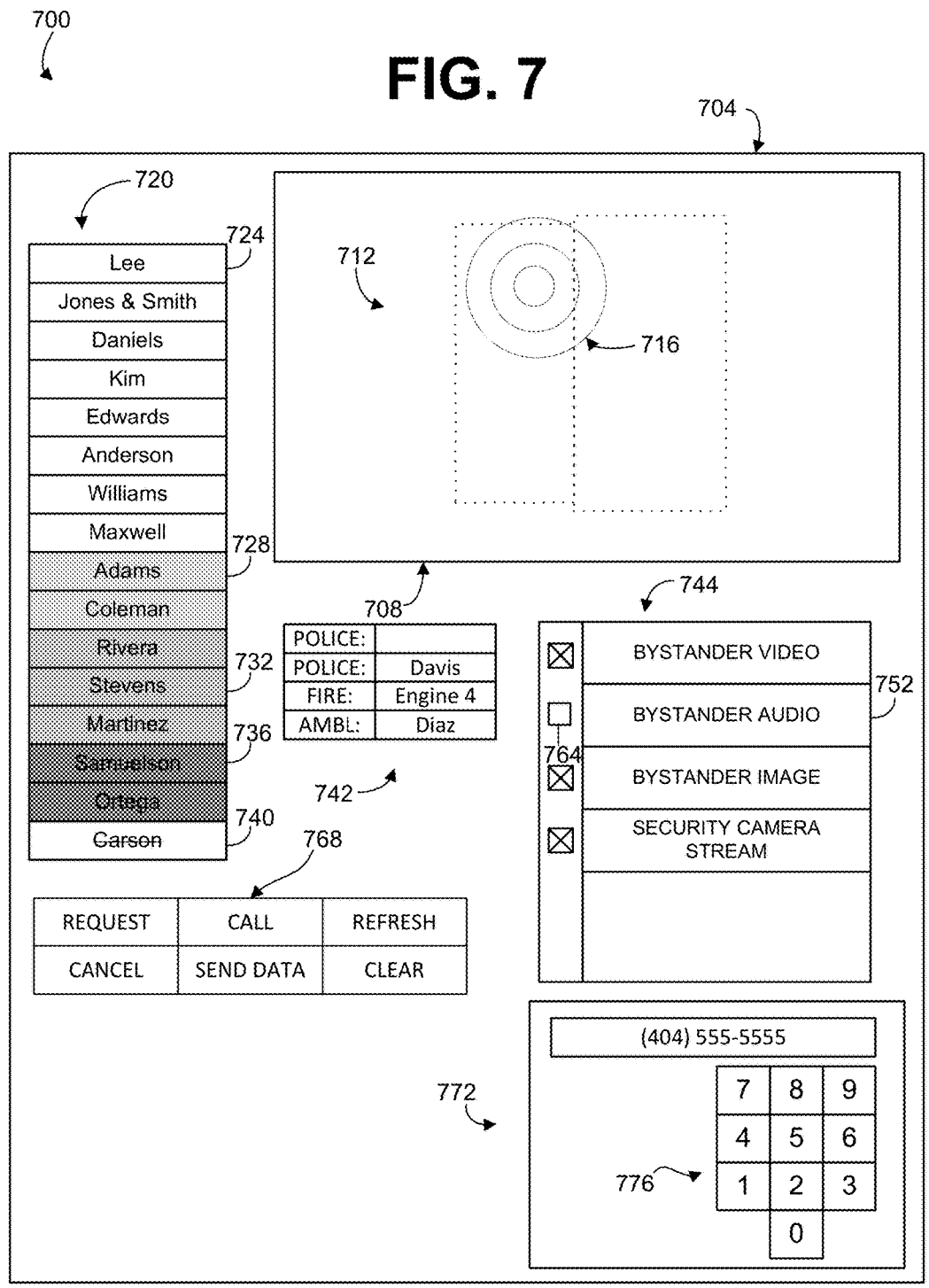
FIG. 7 is a depiction of an exemplary dashboard illustrating aspects of the present disclosure.

FIG. 7 is a depiction of an exemplary dashboard illustrating aspects of the present disclosure. Dashboard 700 may be generated, for example, by emergency services server 138. Dashboard 700 may be a user interface with a graphical representation of aspects of the present disclosure. Dashboard 700 may include interactive and non-interactive elements. Dashboard 700 may be partially or entirely generated by emergency server 138. Dashboard 700 may be stored and run on emergency server 138 or a separate device, and the separate device may be in communication with emergency server 138. Dashboard 700 may be an XML dashboard or include XML elements. Dashboard 700 may be or include a web site. Dashboard 700 may incorporate dynamic elements updated based on, for example, real-time information and analysis. For example, dashboard 700 may be updated based on emergency requests received by emergency server 138 from smartphone 104, communications with user equipment 100, the status of network elements, such as radio access technology 120, or communications with entity 140. For example, dashboard 700 may render information based on communications received from or transmitted to user equipment 100 associated with a first responder. As another example, dashboard 700 may render information based on communications with a device management server.

Dashboard 700 may include work area 704. Work area 704 may include static and dynamic elements. For example, work area 704 may include search pane 708. Search pane 708 may generate map 712 representing one or more geographical regions, such as geographical regions 501 and 502 as depicted in FIG. 3. Map 712 may also include candidate zone 716. Search pane 708 may be used to set or adjust candidate zone 716. Search pane 708 may also display emergency response resources. For example, map 712 may display resources as depicted in FIG. 5. Work area 704 may also include resource pane 720. Resource pane 720, as shown, includes personnel resources, but may also include equipment (such as vehicles) or other resources. Resource pane 720 may display a list of resources arranged, for example, by an identifier, availability, suitableness (based on, for example, a score of the resource as determined for an emergency), or some combination of these and other factors. For example, entry 724 has no shading (corresponding to the shading used in FIG. 5) indicating the resource is not in use. Entry 724 includes an identifier ("Lee") which may be a personal identifier. This personal identifier may be, for example, a name associated with a user account provisioned for a device, such as smartphone 104. The other available entries may be, for example, randomly ordered, ordered by a suitability score, alphabetically, or other factors or a combination of factors. Entry 728 as shown is rendered as being shaded slightly darker than the "available entries" to indicate that user equipment 100 associated with "Adams" has given an indication or it has otherwise been determined that the resource is involved in a low-priority engagement. Entry 732 as shown is rendered as another shade dark to indicate that user equipment 100 associated with "Stevens" has given an indication or it has otherwise been determined that the resource is involved in a medium-priority engagement. Entry 736 as shown is rendered as an even darker shade to indicate that user equipment associated with "Samuelson" is involved in a high-priority engagement. Entry 740 as shown has a line through it to indicate that a denial has been received from user equipment 100 associated with the "Carson." Other rendering and display techniques may provide indications of availability, suitability, order of requests, or other information. A user of dashboard 700 may change the order or classification of one or more entries in resource pane 720. For example, a user may select entry 724 and delete it from resource pane 720 or change its place in the order.

Work area 704 may include resource request list 742. Resource request list 742 may include entries corresponding to the resources evaluated as being required for the emergency. For example, two police units, a firefighting unit, and an ambulance unit may be required. Resources that have already been requested and accepted may be listed, while unmet resources may have the requirement shown and the absence of a resource indicated. For example, a police unit may be required. Entries in resource pane 720 may correspond to a candidate set of police resources, as described in relation to FIG. 4.

Work area 704 may also include feed pane 744. Feed pane 744 may display and allow interaction and management of data received in connection with an emergency request. For example, an emergency request, as depicted and described in relation to FIG. 3, may have been received by emergency server 138. The emergency request may have included a video, audio, and an image. Separately, there may be a video stream available from a security camera, such as camera 208. These files may be accessed through dashboard 700. The files may be partially or wholly separated from an emergency request through dashboard 700 or otherwise. These files may also be sent using dashboard 700. These files may be sent, for example, in a request to a resource. For example, an interface element, such as element 764 (depicted as a selection box), may be used to indicate that the data should be provided with or not provided with a request to a resource. For example, by selecting element 764, "BYSTANDER AUDIO" data 752 would be sent as part of the request. For example, the "BYSTANDER VIDEO", "BYSTANDER IMAGE", and "SECURITY CAMERA STREAM" data may be packaged by emergency services server 138 with a request to the user equipment 100 associated with the resource "Lee."

Work area 704 may also include command pane 768. The command pane may provide direct control over functions of emergency services server 138. For example, emergency services server 138 may send requests automatically, without user interaction. Emergency services server 138 may also send requests based on commands received from dashboard 700, such as commands sent through command pane 768. Work area 704 may include softphone interface 772. Softphone interface 772 may include a dial pad and may display a phone number of a caller or callee. Softphone interface 772 may allow for calls to be initiated using embedded, peripheral, or remote devices.

Figure 8:
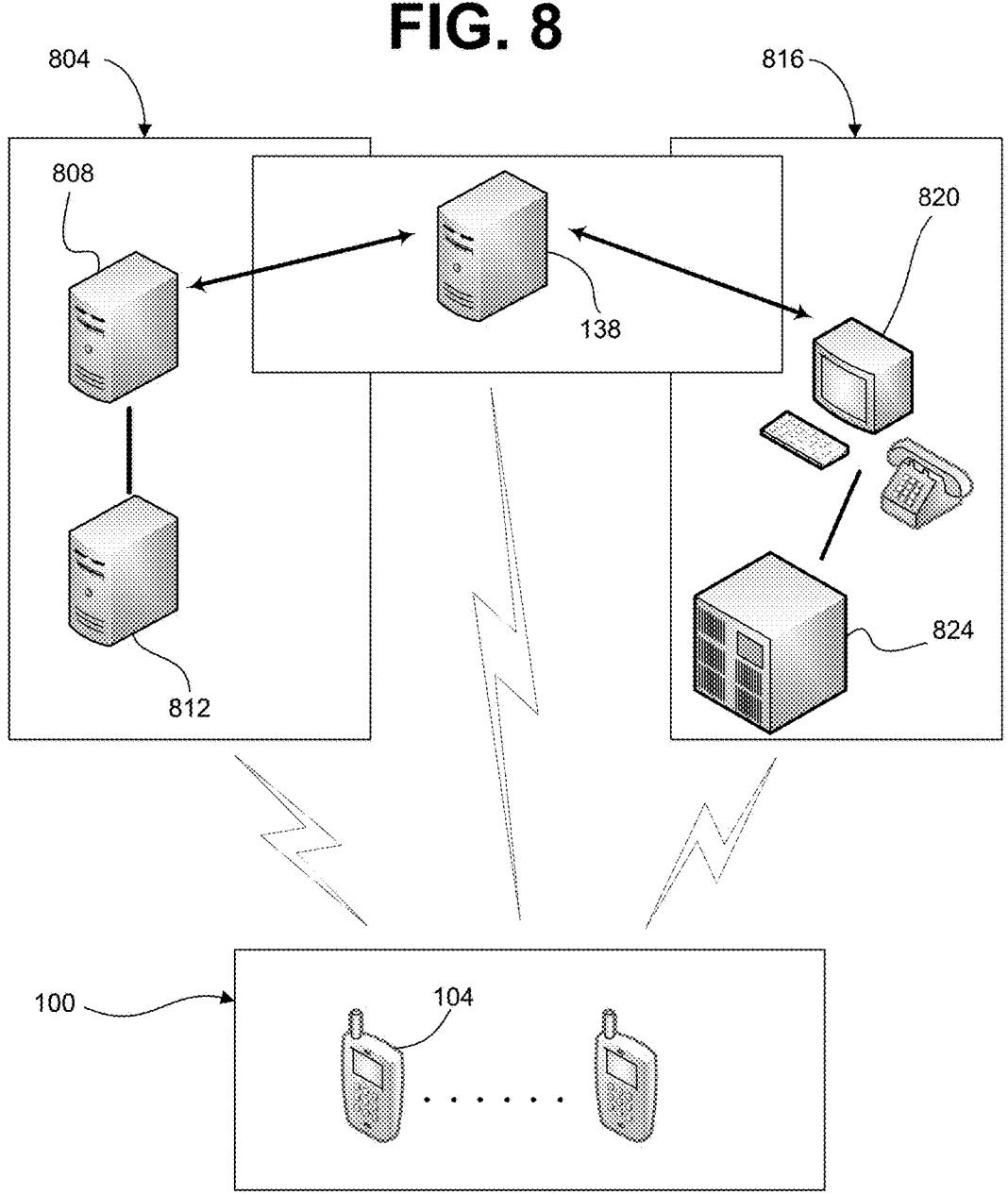
FIG. 8 is a block diagram of an exemplary mobile emergency network.

FIG. 8 illustrates an exemplary architecture of a mobile emergency response network. Emergency responder network 804 may include, for example, authentication server 808 and device management server 812. User equipment 100 may communicate with emergency responder network 804 and may be provisioned by device management server 812 and may be authenticated by authentication server 808. These may be the only communications between user equipment 100 and emergency responder network 804. PSAP network 816 may include PSAP terminal 820 and PSAP Private Branch Exchange (PBX) 824. PSAP network 816 may only be able to connect with user equipment 100 through non-IP voice calls over a Public Switched Telephone Network (PSTN) through PSAP PBX 824. PSAP network 816 may be unable to otherwise communicate or interact with user equipment 100. PSAP network 816 may also have a limited number of lines. If all available lines are in use, calls may be rejected or redirected to a voicemail system. When, for example, PSAP PBX 824 receives a call, an indication may be sent by, for example, PSAP PBX 824 to emergency services server 138. The indication may be a message including information such as a source location of the voice call, a phone number, whether the call was rejected, or other information. This may also occur, for example, when PSAP PBX 824 receives an IP voice call, MMS message, or other electronic communication it is unable to interpret or respond to. When that occurs, the electronic communication may be redirected to emergency services server 138. PSAP network 816 may, for example, provide information regarding an incompatible electronic communication to emergency services 816. For example, PSAP network 816 may provide an indication to emergency services server 138 that an incompatible message has been received and, if possible, a time it was received or a source phone number. Emergency services server 138 may be part of one or more of emergency responder network 804 or PSAP network 816. Emergency services server 138 may also be part of telecommunications network 136. Emergency services server 138 may, for example, connect to emergency response network 804 or PSAP network 816 using a virtual private network (VPN) tunnel. This tunnel may be, for example, a secure tunnel, such as a Secure Socket Tunneling Protocol (SSTP) tunnel. Emergency services server 138 may, for example, provide a dashboard (such as depicted and described in relation in FIG. 7) to PSAP terminal 820. Emergency services server 138 may be in communication with user equipment 100 as described herein, such as, for example, as illustrated and described in relation to FIGS. 4 and 6.

Figure 9:
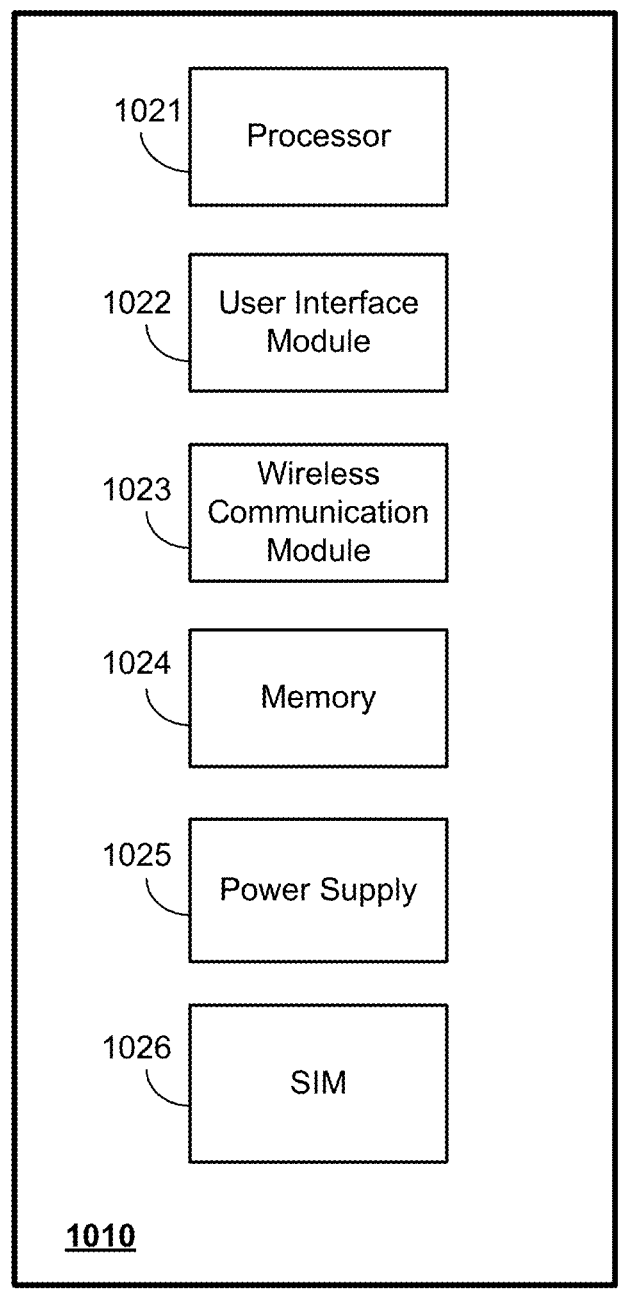
FIG. 9 is a block diagram of an example mobile device which may be utilized to facilitate mobile emergency response network.

FIG. 9 illustrates an example wireless device 1010 (such as user equipment 100) that may be used in connection with an example of a mobile emergency response network. References will also be made to other figures of the present disclosure as appropriate. For example, user equipment 100, such as smartphone 104 or tablet 108, may be wireless devices of the type described in regard to FIG. 9, and may have some, all, or none of the components and modules described in regard to FIG. 9. It will be appreciated that the components and modules of wireless device 1010 illustrated in FIG. 9 are illustrative, and that any number and type of components and/or modules may be present in wireless device 1010. In addition, the functions performed by any or all of the components and modules illustrated in FIG. 9 may be performed by any number of physical components. Thus, it is possible that in some examples the functionality of more than one component and/or module illustrated in FIG. 9 may be performed by any number or types of hardware or hardware and software.

Processor 1021 may comprise any appropriate circuitry that performs operations on behalf of wireless device 1010. Such circuitry may include hardware and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one example, processor 1021 executes software (i.e., computer readable instructions stored in a computer readable medium) that may include functionality related to mobile emergency response, for example. User interface module 1022 may be any type or combination of hardware and software that enables a user to operate and interact with wireless device 1010, and, in one example, to interact with a system enabling the user to place, request, and/or receive calls, text communications of any type, voicemail, voicemail notifications, voicemail content and/or data, and/or a system. For example, user interface module 1022 may include a display, physical and/or "soft" keys, voice recognition software, a microphone, a touch screen, a speaker, and the like. A display of user interface module 1022 may display, for example, application graphical user interfaces (GUIs), text, images, video, telephony functions such as Caller ID data, setup functions, menus, music, metadata, messages, wallpaper, graphics, Internet content, device status, preference settings, map and location data, routes and other directions, points of interest (POI), and the like. User interface module 1022 may provide information visually (via, for example, a display), audibly (via, for example, a speaker), mechanically (via, for example, a vibrating mechanism such as a vibration motor), including haptically (or haptic feedback), or a combination thereof.

Wireless communication module 1023 may be any type of transceiver including any combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type of Subscriber Identity Module and may be configured on a removable or non-removable SIM card that allows wireless device 1010 to store data on SIM 1026.

Figure 10:
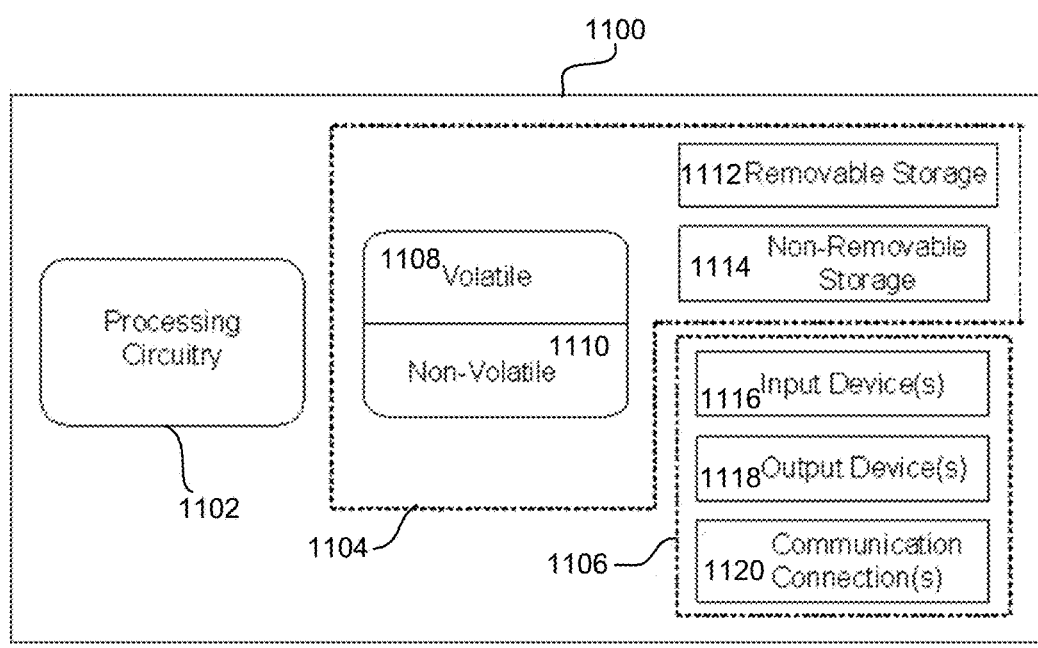
FIG. 10 is a block diagram of an exemplary processor in which one or more disclosed examples may be implemented for a mobile emergency response network.

FIG. 10 is a block diagram of an example apparatus 1100 which may be employed in any of the examples described herein, including as one or more components of user equipment 100, emergency services server 138, and/or any related equipment and/or as one or more components of any third party system or subsystem that may implement any portion of the subject matter described herein. Apparatus 1100 may be a processor. It is emphasized that the block diagram depicted in FIG. 10 is exemplary and not intended to imply a specific implementation. Thus, the apparatus 1100 may be implemented in a single processor or multiple processors. Multiple processors may be distributed or centrally located. Multiple processors can communicate wirelessly, via hard wire, or a combination thereof. Apparatus 1100 may include circuitry and other components that enable apparatus 1100 to perform any of the functions and methods described herein. Such circuitry and other components may also enable apparatus 1100 to communicate and/or interact with other devices and components, for example any other component of any device disclosed herein or any other device, in such a manner as to enable apparatus 1100 and such other devices and/or components to perform any of the disclosed functions and methods.

As depicted in FIG. 10, the apparatus 1100 may comprise a processing portion 1102, a memory portion 1104, and an input/output portion 1106. The processing portion 1102, memory portion 1104, and input/output portion 1106 are coupled together (coupling not shown in FIG. 10) to allow communications between these portions. The input/output portion 1106 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The apparatus 1100 may be implemented as a client processor and/or a server processor. In a basic configuration, the apparatus 1100 may include at least one processing portion 1102 and memory portion 1104. The memory portion 1104 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for a mobile emergency response network, text and data communications, calls, voicemail, multimedia content, visual voicemail applications, etc. Depending upon the exact configuration and type of processor, the memory portion 1104 can be volatile (such as RAM) 1108, non-volatile (such as ROM, flash memory, etc.) 1110, or a combination thereof. The apparatus 1100 can have additional features/functionality. For example, the apparatus 1100 may include additional storage (removable storage 1112 and/or non-removable storage 1114) including, but not limited to, magnetic or optical disks, tape, flash, smart cards or a combination thereof. Computer storage media, such as memory and storage elements 1104, 1108, 1110, 1112, and 1114, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the apparatus 1100. Any such computer storage media may be part of the apparatus 1100. Any computer-readable storage medium described herein, including memory, is not to be construed as a signal, transient signal, or propagating signal. Memory, as well as any computer-readable storage medium described herein, is to be construed as an article of manufacture.

The apparatus 1100 may also contain the communications connection(s) 1120 that allow the apparatus 1100 to communicate with other devices, for example through a radio access network (RAN). Communications connection(s) 1120 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The apparatus 1100 also can have input device(s) 1116 such as keyboard, keypad, mouse, pen, voice input device, touch input device, etc. Output device(s) 1118 such as a display, speakers, printer, etc., also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how mobile emergency response networks may be implemented with stationary and non-stationary network structures and architectures. It can be appreciated, however, that mobile emergency response networks as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1 Evolution Data Optimized (EVDO), Code Division Multiple Access-2000 (cdma2000 3), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, systems, methods, and apparatuses for mobile emergency response networks may be applied independently of the method of data transport and does not depend on any particular network architecture or underlying protocols.

Figure 11:
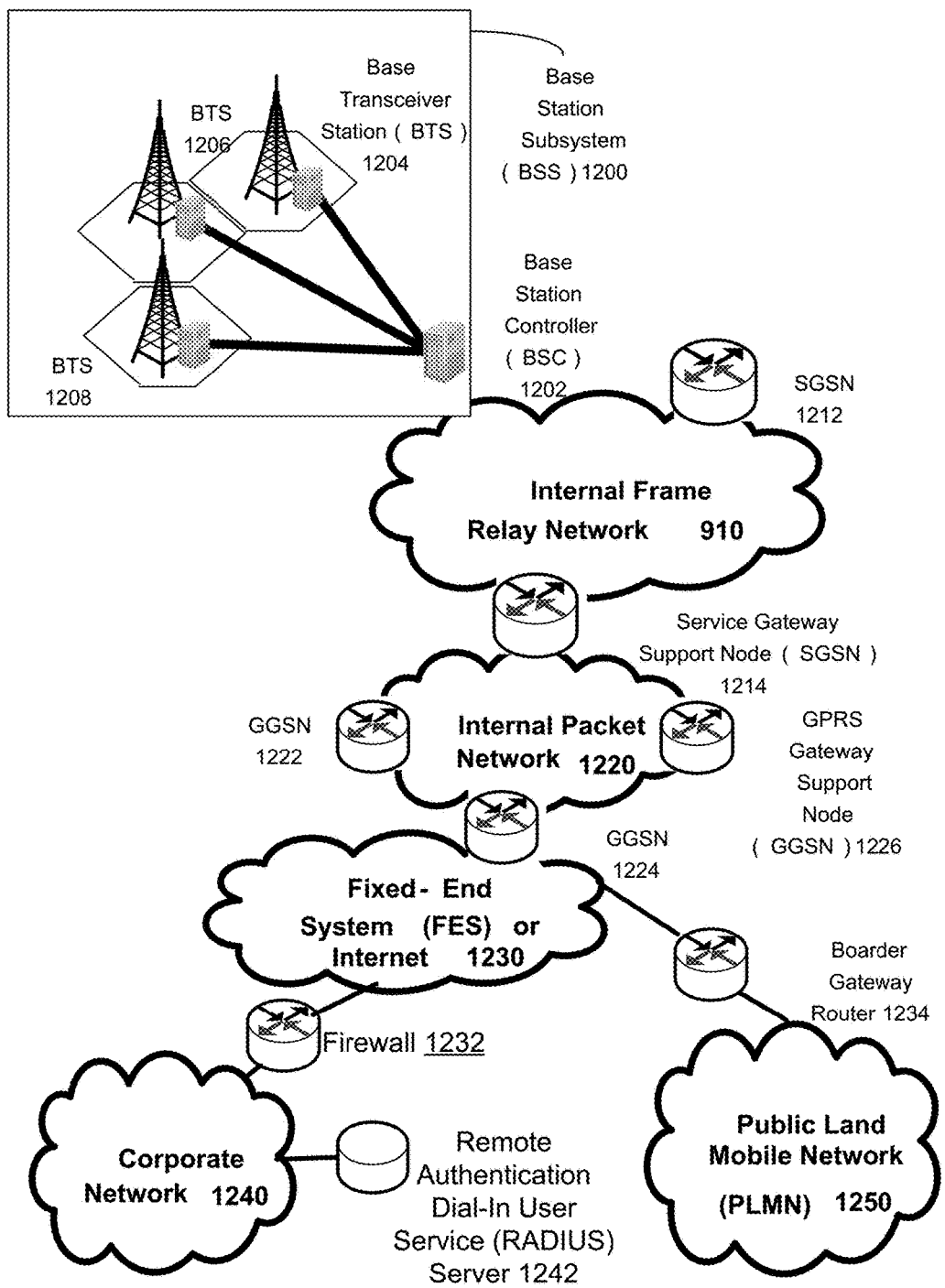
FIG. 11 is a block diagram of an exemplary packet-based mobile cellular network environment, such as a GPRS network, in which one or more disclosed examples may be implemented for a mobile emergency response network.
Figure 12:
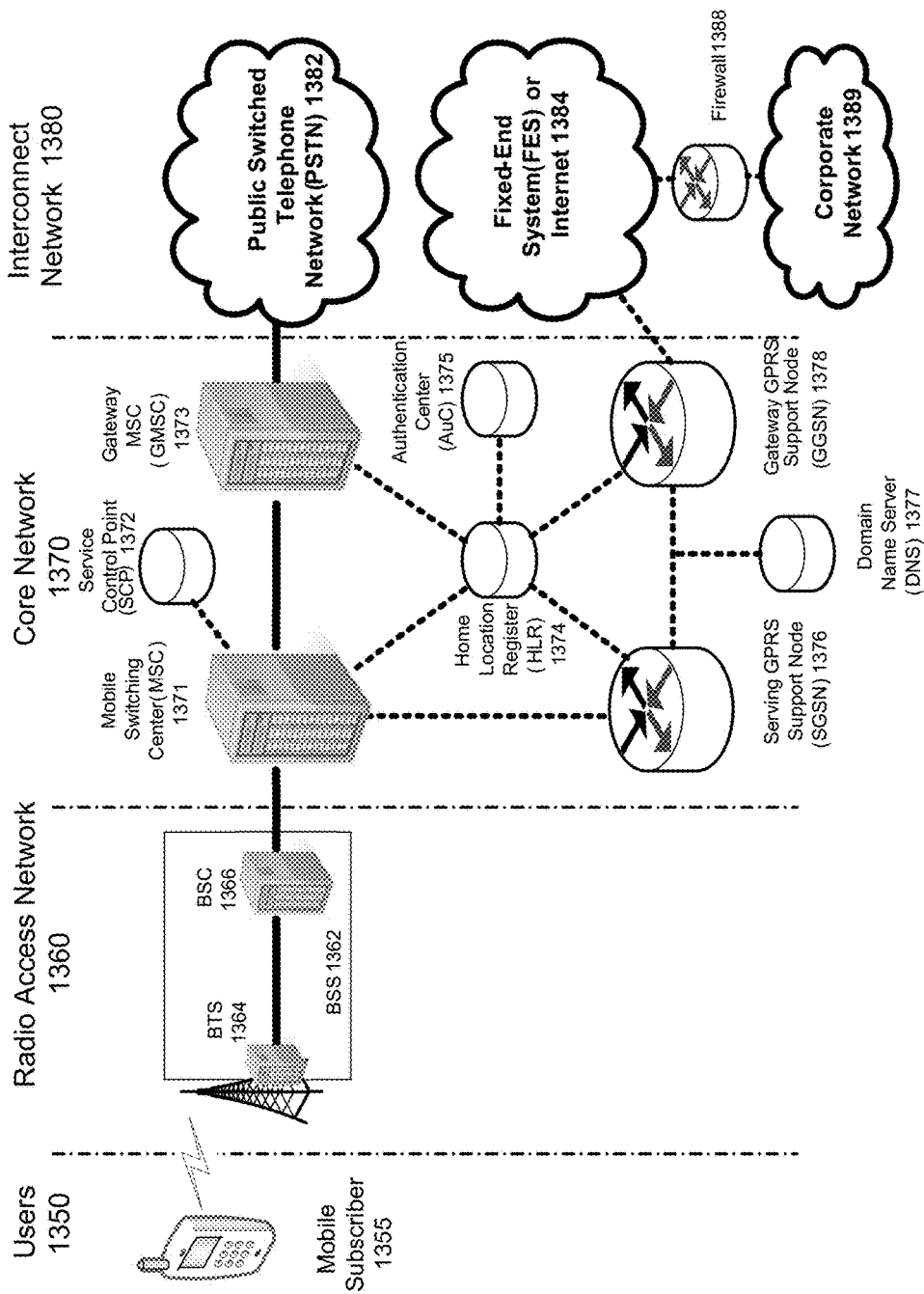
FIG. 12 illustrates a non-limiting exemplary architecture of a typical GPRS network, segmented into four groups, in which one or more disclosed examples may be implemented for a mobile emergency response network.
Figure 13:
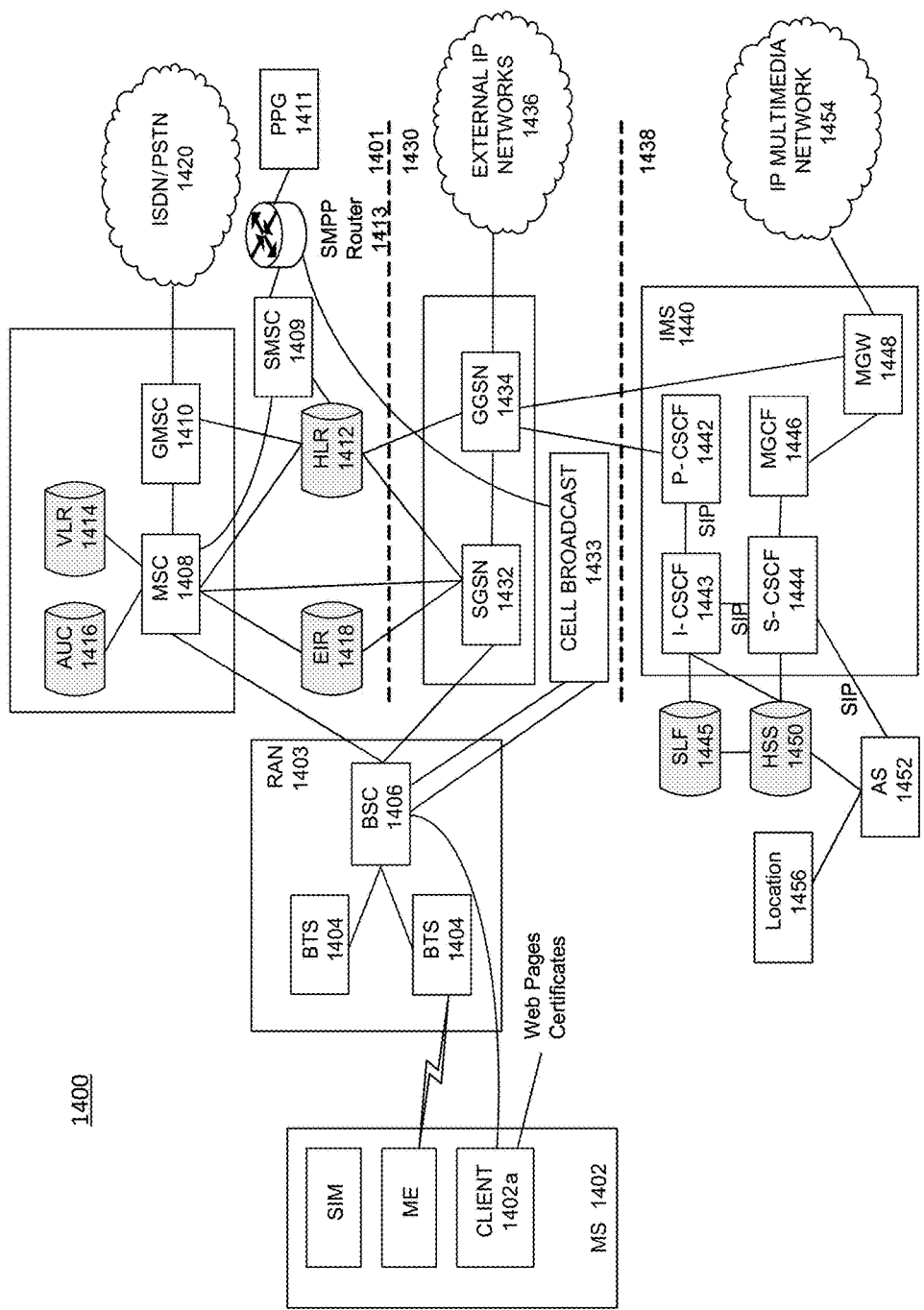
FIG. 13 illustrates a non-limiting alternate block diagram of an exemplary GSM/GPRS/IP multimedia network architecture in which one or more disclosed examples may be implemented for a mobile emergency response network.

FIG. 11 depicts an overall block diagram of an example packet-based mobile cellular network environment, such as a GPRS network, that may be utilized to facilitate intelligent traffic routing, as described herein. In the example packet-based mobile cellular network environment shown in FIG. 11, there are a plurality of Base Station Subsystems (BSS) 1200 (only one is shown), each of which comprises a Base Station Controller (BSC) 1202 serving a plurality of Base Transceiver Stations (BTS) such as BTSs 1204, 1206, and 1208. BTSs 1204, 1206, 1208, etc. are the access points where users of packet-based mobile devices become connected to the wireless network. In example fashion, the packet traffic originating from user devices is transported via an over-the-air interface to a BTS 1208, and from the BTS 1208 to the BSC 1202. Base station subsystems, such as BSS 1200, are a part of internal frame relay network 1210 that can include Service GPRS Support Nodes (SGSN) such as SGSN 1212 and 1214. Each SGSN is connected to an internal packet network 820 through which a SGSN 1212, 1214, etc., can route data packets to and from a plurality of gateway GPRS support nodes (GGSN) 1222, 1224, 1226, etc. As illustrated, SGSN 1214 and GGSNs 1222, 1224, and 1226 are part of internal packet network 1220. Gateway GPRS serving nodes 1222, 1224 and 1226 mainly provide an interface to external Internet Protocol (IP) networks such as Public Land Mobile Network (PLMN) 1250, corporate intranets 1240, or Fixed-End System (FES) or the public Internet 1230. As illustrated, subscriber corporate network 1240 may be connected to GGSN 1224 via firewall 1232; and PLMN 1250 is connected to GGSN 1224 via boarder gateway router 1234. The Remote Authentication Dial-In User Service ("RADIUS") server 1242 may be used for caller authentication when a user of a mobile cellular device calls corporate network 1240.

Generally, there may be a several cell sizes in a GSM network, referred to as macro, micro, pico, femto, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential environments, or small business environments. On the other hand, umbrella cells are used to cover shadowed regions of smaller cells and fill in gaps in coverage between those cells.

FIG. 11 illustrates an architecture of a typical GPRS network that may be utilized to facilitate intelligent traffic routing, as described herein. The architecture depicted in FIG. 11 may be segmented into four groups: users 1350, radio access network 1360, core network 1370, and interconnect network 1380. Users 1350 comprise a plurality of end users. Note, user equipment 100 is referred to as a mobile subscriber in the description of network shown in FIG. 11. In an aspect, the device depicted as mobile subscriber 1355 comprises a communications device (e.g., smartphone 104). Radio access network 1360 comprises a plurality of base station subsystems such as BSSs 1362, which include BTSs 1364 and BSCs 1366. Core network 1370 comprises a host of various network elements. As illustrated in FIG. 11, core network 1370 may comprise Mobile Switching Center (MSC) 1371, Service Control Point (SCP) 1372, gateway MSC 1373, SGSN 1376, Home Location Register (HLR) 1374, Authentication Center (AuC) 1375, Domain Name Server (DNS) 1377, and GGSN 1378. Interconnect network 1380 also comprises a host of various networks and other network elements. As illustrated in FIG. 11, interconnect network 1380 comprises Public Switched Telephone Network (PSTN) 1382, Fixed-End System (FES) or Internet 984, firewall 1388, and Corporate Network 1389.

A mobile switching center can be connected to a large number of base station controllers. At MSC 1371, for instance, depending on the type of traffic, the traffic may be separated in that voice may be sent to Public Switched Telephone Network (PSTN) 1382 through Gateway MSC (GMSC) 1373, and/or data may be sent to SGSN 1376, which then sends the data traffic to GGSN 1378 for further forwarding.

When MSC 1371 receives call traffic, for example, from BSC 1366, it sends a query to a database hosted by SCP 1372. The SCP 1372 processes the request and issues a response to MSC 971 so that it may continue call processing as appropriate.

The HLR 1374 is a centralized database for users to register to the GPRS network. HLR 1374 stores static information about the subscribers such as the International Mobile Subscriber Identity (IMSI), subscribed services, and a key for authenticating the subscriber. HLR 1374 also stores dynamic subscriber information such as the current location of the mobile subscriber. Associated with HLR 1374 is AuC 1375. AuC 1375 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device (such as user equipment 100), used by an end user of the mobile cellular service. When a mobile subscriber turns on his or her mobile device, the mobile device goes through an attach process by which the mobile device attaches to an SGSN of the GPRS network. In FIG. 11, when mobile subscriber 1355 initiates the attach process by turning on the network capabilities of the mobile device, an attach request is sent by mobile subscriber 1355 to SGSN 1376. The SGSN 1376 queries another SGSN, to which mobile subscriber 712 was attached before, for the identity of mobile subscriber 1355. Upon receiving the identity of mobile subscriber 1355 from the other SGSN, SGSN 1376 requests more information from mobile subscriber 1355. This information is used to authenticate mobile subscriber 1355 to SGSN 1376 by HLR 1374. Once verified, SGSN 1376 sends a location update to HLR 1374 indicating the change of location to a new SGSN, in this case SGSN 1376. HLR 1374 notifies the old SGSN, to which mobile subscriber 1355 was attached before, to cancel the location process for mobile subscriber 1355. HLR 1374 then notifies SGSN 1376 that the location update has been performed. At this time, SGSN 1376 sends an Attach Accept message to mobile subscriber 1355, which in turn sends an Attach Complete message to SGSN 1376.

After attaching itself with the network, mobile subscriber 1355 then goes through the authentication process. In the authentication process, SGSN 1376 sends the authentication information to HLR 1374, which sends information back to SGSN 1376 based on the user profile that was part of the user's initial setup. The SGSN 1376 then sends a request for authentication and ciphering to mobile subscriber 712. The mobile subscriber 1355 uses an algorithm to send the user identification (ID) and password to SGSN 1376. The SGSN 1376 uses the same algorithm and compares the result. If a match occurs, SGSN 1376 authenticates mobile subscriber 1355.

Next, the mobile subscriber 1355 establishes a user session with the destination network, corporate network 1389, by going through a Packet Data Protocol (PDP) activation process. Briefly, in the process, mobile subscriber 1355 requests access to the Access Point Name (APN), for example, UPS.com, and SGSN 1376 receives the activation request from mobile subscriber 1355. SGSN 1376 then initiates a Domain Name Service (DNS) query to learn which GGSN node has access to the UPS.com APN. The DNS query is sent to the DNS server within the core network 1370, such as DNS 1377, which is provisioned to map to one or more GGSN nodes in the core network 1370. Based on the APN, the mapped GGSN 1378 can access the requested corporate network 1389. The SGSN 1376 then sends to GGSN 1378 a Create Packet Data Protocol (PDP) Context Request message that contains necessary information. The GGSN 1378 sends a Create PDP Context Response message to SGSN 1376, which then sends an Activate PDP Context Accept message to mobile subscriber 1355.

Once activated, data packets of the call made by mobile subscriber 1355 can then go through radio access network 1360, core network 1370, and interconnect network 1380, in a particular fixed-end system or Internet 1384 and firewall 1388, to reach corporate network 1389.

FIG. 14 illustrates an example block diagram view of a GSM/GPRS/IP multimedia network architecture that may be utilized to facilitate intelligent traffic routing, as described herein. As illustrated, the architecture of FIG. 14 includes a GSM core network 1400, a GPRS network 1430 and an IP multimedia network 1438. The GSM core network 1401 includes a Mobile Station (MS) 1402, at least one Base Transceiver Station (BTS) 1404 and a Base Station Controller (BSC) 1406. The MS 1402 is physical equipment or Mobile Equipment (ME), such as a mobile phone or a laptop computer that is used by mobile subscribers, with a Subscriber Identity Module (SIM) or a Universal Integrated Circuit Card (UICC). The SIM or UICC includes an International Mobile Subscriber Identity (IMSI), which is a unique identifier of a subscriber. The BTS 1404 is physical equipment, such as a radio tower, that enables a radio interface to communicate with the MS. Each BTS may serve more than one MS. The BSC 1406 manages radio resources, including the BTS. The BSC may be connected to several BTSs. The BSC and BTS components, in combination, are generally referred to as a base station (BSS) or radio access network (RAN) 1403.

The GSM core network 1401 also includes a Mobile Switching Center (MSC) 1008, a Gateway Mobile Switching Center (GMSC) 1410, a Home Location Register (HLR) 1412, Visitor Location Register (VLR) 1414, an Authentication Center (AuC) 1418, and an Equipment Identity Register (EIR) 1416. The MSC 1408 performs a switching function for the network. The MSC also performs other functions, such as registration, authentication, location updating, handovers, and call routing. The GMSC 1410 provides a gateway between the GSM network and other networks, such as an Integrated Services Digital Network (ISDN) or Public Switched Telephone Networks (PSTNs) 1420. Thus, the GMSC 1410 provides interworking functionality with external networks.

The HLR 1412 is a database that contains administrative information regarding each subscriber registered in a corresponding GSM network. The HLR 1412 also contains the current location of each MS. The VLR 1414 is a database that contains selected administrative information from the HLR 1412. The VLR contains information necessary for call control and provision of subscribed services for each MS currently located in a geographical area controlled by the VLR. The HLR 1412 and the VLR 1414, together with the MSC 1408, provide the call routing and roaming capabilities of GSM. The AuC 1416 provides the parameters needed for authentication and encryption functions. Such parameters allow verification of a subscriber's identity. The EIR 1418 stores security-sensitive information about the mobile equipment.

A Short Message Service Center (SMSC) 1409 allows one-to-one Short Message Service (SMS) messages to be sent to/from the MS 1402. A Push Proxy Gateway (PPG) 1411 is used to "push" (i.e., send without a synchronous request) content to the MS 1002. The PPG 1411 acts as a proxy between wired and wireless networks to facilitate pushing of data to the MS 1402. A Short Message Peer to Peer (SMPP) protocol router 1413 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1402 sends a location update including its current location information to the MSC/VLR, via the BTS 1404 and the BSC 1406. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1430 is logically implemented on the GSM core network architecture by introducing two packet-switching network nodes, a serving GPRS support node (SGSN) 1432, a cell broadcast and a Gateway GPRS support node (GGSN) 1434. The SGSN 1432 is at the same hierarchical level as the MSC 1408 in the GSM network. The SGSN controls the connection between the GPRS network and the MS 1402. The SGSN also keeps track of individual MS's locations and security functions and access controls.

A Cell Broadcast Center (CBC) 1433 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1434 provides a gateway between the GPRS network and a public packet network (PDN) or other IP networks 1436. That is, the GGSN provides interworking functionality with external networks, and sets up a logical link to the MS through the SGSN. When packet-switched data leaves the GPRS network, it is transferred to an external TCP-IP network 1436, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1430 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1438 was introduced with 3GPP Release 5, and includes an IP multimedia subsystem (IMS) 1440 to provide rich multimedia services to end users. A representative set of the network entities within the IMS 1440 are a call/session control function (CSCF), a media gateway control function (MGCF) 1446, a media gateway (MGW) 1448, and a master subscriber database, called a home subscriber server (HSS) 1450. The HSS 1450 may be common to the GSM network 1401, the GPRS network 1430 as well as the IP multimedia network 1438.

The IP multimedia system 1440 is built around the call/session control function, of which there are three types: an interrogating CSCF (I-CSCF) 1043, a proxy CSCF (P-CSCF) 1042, and a serving CSCF (S-CSCF) 1444. The P-CSCF 1042 is the MS's first point of contact with the IMS 1440. The P-CSCF 1442 forwards session initiation protocol (SIP) messages received from the MS to an SIP server in a home network (and vice versa) of the MS. The P-CSCF 1442 may also modify an outgoing request according to a set of rules defined by the network operator (for example, address analysis and potential modification).

The I-CSCF 1443 forms an entrance to a home network and hides the inner topology of the home network from other networks and provides flexibility for selecting an S-CSCF. The I-CSCF 1443 may contact a subscriber location function (SLF) 1445 to determine which HSS 1450 to use for the particular subscriber, if multiple HSSs 1450 are present. The S-CSCF 1444 performs the session control services for the MS 1402. This includes routing originating sessions to external networks and routing terminating sessions to visited networks. The S-CSCF 1444 also decides whether an application server (AS) 1452 is required to receive information on an incoming SIP session request to ensure appropriate service handling. This decision is based on information received from the HSS 1450 (or other sources, such as an application server 1452). The AS 1452 also communicates to a location server 1456 (e.g., a Gateway Mobile Location Center (GMLC)) that provides a position (e.g., latitude/longitude coordinates) of the MS 1402.

The HSS 1450 contains a subscriber profile and keeps track of which core network node is currently handling the subscriber. It also supports subscriber authentication and authorization functions (AAA). In networks with more than one HSS 1450, a subscriber location function provides information on the HSS 1450 that contains the profile of a given subscriber.

The MGCF 1446 provides interworking functionality between SIP session control signaling from the IMS 1440 and ISUP/BICC call control signaling from the external GSTN networks (not shown). It also controls the media gateway (MGW) 1448 that provides user-plane interworking functionality (e.g., converting between AMR- and PCM-coded voice). The MGW 1448 also communicates with other IP multimedia networks 1454.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

FIG. 15 illustrates a PLMN block diagram view of an exemplary architecture in which mobile emergency response may be incorporated. Mobile Station (MS) 1501 is the physical equipment used by the PLMN subscriber. In one illustrative example, communications device 40 may serve as Mobile Station 1501. Mobile Station 1501 may be one of, but not limited to, a cellular telephone, a cellular telephone in combination with another electronic device or any other wireless mobile communication device.

Mobile Station 1501 may communicate wirelessly with Base Station System (BSS) 1510. BSS 1510 contains a Base Station Controller (BSC) 1511 and a Base Transceiver Station (BTS) 1512. BSS 1510 may include a single BSC 1511/BTS 1512 pair (Base Station) or a system of BSC/BTS pairs which are part of a larger network. BSS 1510 is responsible for communicating with Mobile Station 1501 and may support one or more cells. BSS 1510 is responsible for handling cellular traffic and signaling between Mobile Station 1501 and Core Network 1540. Typically, BSS 1510 performs functions that include, but are not limited to, digital conversion of speech channels, allocation of channels to mobile devices, paging, and transmission/reception of cellular signals.

Additionally, Mobile Station 1501 may communicate wirelessly with Radio Network System (RNS) 1520. RNS 1520 contains a Radio Network Controller (RNC) 1521 and one or more Node(s) B 1322. RNS 1320 may support one or more cells. RNS 1520 may also include one or more RNC 1521/Node B 1522 pairs or alternatively a single RNC 1521 may manage multiple Nodes B 1522. RNS 1520 is responsible for communicating with Mobile Station 1501 in its geographically defined area. RNC 1521 is responsible for controlling the Node(s) B 1522 that are connected to it and is a control element in a UMTS radio access network. RNC 1521 performs functions such as, but not limited to, load control, packet scheduling, handover control, security functions, as well as controlling Mobile Station 1501's access to the Core Network (CN) 1540.

The evolved UMTS Terrestrial Radio Access Network (E-UTRAN) 1530 is a radio access network that provides wireless data communications for Mobile Station 1501 and User Equipment 1502. E-UTRAN 1530 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1530 may include of series of logical network components such as E-UTRAN Node B (eNB) 1531 and E-UTRAN Node B (eNB) 1532. E-UTRAN 1530 may contain one or more eNBs. User Equipment 1502 may be any user device capable of connecting to E-UTRAN 1530 including, but not limited to, a personal computer, laptop, mobile device, wireless router, or other device capable of wireless connectivity to E-UTRAN 1530. The improved performance of the E-UTRAN 1530 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 15 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1501 may communicate with any or all of BSS 1510, RNS 1520, or E-UTRAN 1530. In an illustrative system, each of BSS 1510, RNS 1520, and E-UTRAN 1530 may provide Mobile Station 1501 with access to Core Network 1540. The Core Network 1540 may include of a series of devices that route data and communications between end users. Core Network 1540 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1541 is part of Core Network 1540, and interacts with Visitor Location Register (VLR) and Mobile-Services Switching Center (MSC) Server 1560 and Gateway MSC Server 1561 in order to facilitate Core Network 1540 resource control in the CS domain. Functions of CS-MGW 1541 include, but are not limited to, media conversion, bearer control, payload processing and other mobile network processing such as handover or anchoring. CS-MGW 1540 may receive connections to Mobile Station 1501 through BSS 1510, RNS 1520 or both.

Serving GPRS Support Node (SGSN) 1542 stores subscriber data regarding Mobile Station 1501 in order to facilitate network functionality. SGSN 1542 may store subscription information such as, but not limited to, the International Mobile Subscriber Identity (IMSI), temporary identities, or Packet Data Protocol (PDP) addresses. SGSN 1542 may also store location information such as, but not limited to, the Gateway GPRS Support Node (GGSN) 1544 address for each GGSN where an active PDP exists. GGSN 1544 may implement a location register function to store subscriber data it receives from SGSN 1542 such as subscription or location information.

Serving Gateway (S-GW) 1543 is an interface which provides connectivity between E-UTRAN 1530 and Core Network 1540. Functions of S-GW 1543 include, but are not limited to, packet routing, packet forwarding, transport level packet processing, event reporting to Policy and Charging Rules Function (PCRF) 1550, and mobility anchoring for inter-network mobility. PCRF 1550 uses information gathered from S-GW 1543, as well as other sources, to make applicable policy and charging decisions related to data flows, network resources and other network administration functions. Packet Data Network Gateway (PDN-GW) 1545 may provide user-to-services connectivity functionality including, but not limited to, network-wide mobility anchoring, bearer session anchoring and control, and IP address allocation for PS domain connections.

Home Subscriber Server (HSS) 1563 is a database for user information, and stores subscription data regarding Mobile Station 1501 or User Equipment 1502 for handling calls or data sessions. Networks may contain one HSS 1563 or more if additional resources are required. Exemplary data stored by HSS 1563 include, but is not limited to, user identification, numbering and addressing information, security information, or location information. HSS 1563 may also provide call or session establishment procedures in both the PS and CS domains.

The VLR/MSC Server 1560 provides user location functionality. When Mobile Station 1501 enters a new network location, it begins a registration procedure. A MSC Server for that location transfers the location information to the VLR for the area. A VLR and MSC Server may be located in the same computing environment, as is shown by VLR/MSC Server 1560, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1501 registration or procedures for handover of Mobile Station 1501 to a different section of the Core Network 1540. GMSC Server 1561 may serve as a connection to alternate GMSC Servers for other mobile stations in larger networks.

Equipment Identity Register (EIR) 1562 is a logical element which may store the International Mobile Equipment Identities (IMEI) for Mobile Station 1501. In a typical example, user equipment may be classified as either "white listed" or "black listed" depending on its status in the network. In one example, if Mobile Station 1501 is stolen and put to use by an unauthorized user, it may be registered as "black listed" in EIR 1562, preventing its use on the network. Mobility Management Entity (MME) 1564 is a control node which may track Mobile Station 1501 or User Equipment 1502 if the devices are idle. Additional functionality may include the ability of MME 1564 to contact an idle Mobile Station 1501 or User Equipment 1502 if retransmission of a previous session is required.

While example embodiments of mobile emergency response networks have been described in connection with various computing devices/processors, the underlying concepts may be applied to any computing device, processor, or system capable of facilitating intelligent traffic routing. The various techniques described herein may be implemented in connection with hardware or software or, where appropriate, with a combination of both. Thus, the methods and apparatuses of mobile emergency response networks, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for intelligent traffic routing, on user equipment as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with mobile emergency response networks as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing intelligent traffic routing as described herein. When implemented on a general-purpose processor, the program code combines with the processor to provide a unique apparatus that operates to invoke the functionality of intelligent traffic routing as described herein.

While mobile emergency response networks have been described in connection with the various embodiments of the various figures, it is to be understood that other similar embodiments may be used or modifications and additions may be made to the described embodiments of mobile emergency response networks without deviating therefrom. For example, one skilled in the art will recognize that mobile emergency response networks as described in the instant application may apply to any environment, whether wired or wireless, and may be applied to any number of such devices connected via a communications network and interacting across the network. Therefore, mobile emergency response networks as described herein should not be limited to any single embodiment, but rather should be construed in breadth and scope in accordance with the appended claims.

What is claimed:

1. An emergency services server comprising:
a processor; and
a memory coupled to the processor, the memory comprising executable instructions that when executed by the processor cause the processor to effectuate operations comprising:
receiving a file defining a geographic area of emergency;
receiving an emergency message over a wireless communication channel from a remote mobile device, the emergency message comprising a multimedia data file,
wherein the multimedia data file comprises metadata;
separating the multimedia file from the emergency message;
extracting a location value from the metadata;
generating an emergency responder request comprising the multimedia data file;
defining, based on the geographic area of emergency and the location value, a candidate region;
identifying a candidate mobile device within the candidate region, wherein the candidate mobile device is not the remote mobile device; and
transmitting the emergency responder request over a second wireless communication channel to the candidate mobile device.

2. The emergency services server of claim 1, wherein the emergency responder request is transmitted to the candidate mobile device responsive to receipt of an indication that a Private Branch Exchange (PBX) associated with a Public Safety Answering Point (PSAP) has received a voice call.

3. The emergency services server of claim 2, wherein the indication comprises a source telephone number associated with a voice call, and wherein the operations further comprise:
determining, based on the indication, a source location of the voice call, wherein the source location is determined based on location information received from a Home Subscriber Server (HSS).

4. The emergency services server of claim 2, wherein the indication comprises a source telephone number associated with a voice call, and wherein the operations further comprise:
determining, based on the indication, a source location of the voice call, wherein the source location is determined based on location information received from a Mobile-Services Switching Center (MSC) Server.

5. The emergency services server of claim 1, wherein the operations further comprise:
associating the candidate mobile device with a user account; and
determining whether to transmit the emergency responder request to the candidate mobile device based at least in part on an account status of the user account.

6. The emergency services server of claim 5, wherein user account is received by the emergency services server from a mobile device provisioning server.

7. The emergency services server of claim 1, wherein the operations further comprise:
receiving, from the candidate mobile device, responsive to the emergency responder request, a rejection message.

8. The emergency services server of claim 7, wherein the rejection message is generated by an emergency services application on the candidate mobile device responsive to the emergency responder request based at least in part on an active status of the emergency services application.

9. The emergency services server of claim 1, wherein the operations further comprise:
receiving, from the candidate mobile device, responsive to the emergency responder request, an acceptance message generated by an emergency services application activated on the candidate mobile device responsive to the emergency responder request.

10. The emergency services server of claim 1, wherein the remote mobile device comprises a Mobile Messaging Service (MMS) client and the emergency message comprises an MMS message.

11. The emergency services server of claim 10, wherein a second remote mobile device comprises an Extensible Messaging and Presence Protocol (XMPP) client and a second emergency message comprises an XMPP message.

12. A method comprising:
receiving a file defining a geographic area of emergency;
receiving an emergency message over a wireless communication channel from a remote mobile device, the emergency message comprising a multimedia data file, wherein the multimedia data file comprises metadata;
separating the multimedia file from the emergency message;
extracting a location value from the metadata;
generating an emergency responder request comprising the multimedia data file;
defining, based on the geographic area of emergency and the location value, a candidate region;
identifying a candidate mobile device within the candidate region, wherein the candidate mobile device is not the remote mobile device; and
transmitting the emergency responder request over a second wireless communication channel to the candidate mobile device.

13. The method of claim 12, wherein the emergency responder request is transmitted to the candidate mobile device responsive to receipt of an indication that a Private Branch Exchange (PBX) associated with a Public Safety Answering Point (PSAP) has received a voice call.

14. The method of claim 13, wherein the indication comprises a source telephone number associated with a voice call, and wherein the operations further comprise determining, based on the indication, a source location of the voice call, wherein the source location is determined based on location information received from a Home Subscriber Server (HSS).

15. The method of claim 14, wherein the indication comprises a source telephone number associated with a voice call, and wherein the method further comprises:
  determining, based on the indication, a source location of the voice call, wherein the source location is determined based on location information received from a Mobile-Services Switching Center (MSC) Server.

16. The method of claim 12, further comprise:
  associating the candidate mobile device with a user account; and
  determining whether to transmit the emergency responder request to the candidate mobile device based at least in part on an account status of the user account.

17. The method of claim 12, wherein user account is received by the emergency services server from a mobile device provisioning server.

18. The method of claim 12, further comprise:
  receiving, from the candidate mobile device, responsive to the emergency responder request, a rejection message.

19. The method of claim 12, wherein the rejection message is generated by an emergency services application on the candidate mobile device responsive to the emergency responder request based at least in part on an active status of the emergency services application.

20. The method of claim 19, further comprise:
  receiving, from the candidate mobile device, responsive to the emergency responder request, an acceptance message generated by an emergency services application activated on the candidate mobile device responsive to the emergency responder request.

* * * * *